United States Patent
Jesse et al.

(10) Patent No.: US 9,346,557 B2
(45) Date of Patent: May 24, 2016

(54) FLIGHT DATA MONITORING AND VALIDATION

(71) Applicant: Flight Data Services Limited, Fareham, Hampshire (GB)

(72) Inventors: Dave Jesse, Fareham (GB); Chris Jesse, Fareham (GB); Anne Seldon, Fareham (GB); Nadim Rahman, Fareham (GB); Farshad Fahimi, Fareham (GB)

(73) Assignee: Flight Data Services Limited, Fareham, Hampshire (GB)

( * ) Notice: Subject to any disclaimer, the term of this patent is extended or adjusted under 35 U.S.C. 154(b) by 211 days.

(21) Appl. No.: 13/721,505

(22) Filed: Dec. 20, 2012

(65) Prior Publication Data

US 2013/0274964 A1    Oct. 17, 2013

(30) Foreign Application Priority Data

Apr. 16, 2012  (GB) .................................. 1206652.8
Oct. 19, 2012  (GB) .................................. 1218856.1

(51) Int. Cl.
*B64D 45/00*    (2006.01)
*G07C 5/08*     (2006.01)
*G05B 23/02*    (2006.01)
*G05D 1/00*     (2006.01)

(52) U.S. Cl.
CPC .............. *B64D 45/00* (2013.01); *G05D 1/0077* (2013.01); *G05B 23/0221* (2013.01); *G07C 5/085* (2013.01)

(58) Field of Classification Search
CPC ............................ G07C 5/085; G05B 23/0221
USPC ...................................... 701/14; 702/189–199
See application file for complete search history.

(56) References Cited

U.S. PATENT DOCUMENTS

| 6,480,770 | B1 | 11/2002 | Wischmeyer | |
|---|---|---|---|---|
| 2005/0192717 | A1 | 9/2005 | Tafs et al. | |
| 2012/0253746 | A1* | 10/2012 | Kolar | ............................ 702/188 |
| 2013/0116996 | A1* | 5/2013 | Callan | ................................ 703/8 |

FOREIGN PATENT DOCUMENTS

| EP | 0100746 A2 | 7/1983 |
|---|---|---|
| EP | 0490745 A1 | 12/1991 |
| WO | 2012/013548 A1 | 2/2012 |

OTHER PUBLICATIONS

Miller et al., "FGS Requirement Rationale [Flight Guidance System]", Proceedings of the 21st Digital Avionics Systems Conference, vol. 2, Oct. 2002, pp. 13.D.1-1-13.D.1-7.*

(Continued)

*Primary Examiner* — Todd Melton
(74) *Attorney, Agent, or Firm* — Renner, Otto, Boisselle & Sklar, LLP

(57) ABSTRACT

A computer-implemented flight data monitoring method is provided for monitoring flight data, for example flight data obtained by a flight data recorder or quick access recorder on an aircraft. The method comprises receiving input flight data, performing flight data validation on the input flight data to generate validated flight data, and performing flight data analysis on the validated flight data to detect at least one predetermined type of flight event. The events may be useful for generating an aircraft safety report, for example. By validating the data before performing the analysis, the number of events which are falsely detected based on invalid or unreliable data can be reduced.

7 Claims, 18 Drawing Sheets

(56) References Cited

OTHER PUBLICATIONS

Search Report for corresponding GB Application No. 1218856.1 dated Nov. 15, 2012.

Search Report for corresponding GB Application No. 1206652.8 dated Nov. 15, 2012.

Examination Report for corresponding Australian Application No. 2013205845 dated Mar. 3, 2015.

* cited by examiner

| Parameter | Phase | Type | Upper Threshold | Lower Threshold |
|---|---|---|---|---|
| Airspeed | Take off | Phase Range | 240 | 120 |
| Acceleration Normal | Taxi | Phase Average | 1.1 | 9 |

FIG. 16

| Param 1 | Param 2 | Param 3 | Express. | Relation-ship | Phase | Correlation Coefficient Threshold | Gradient Upper | Gradient Lower | Offset Upper | Offset Lower | Expect Param 1 | Given Param 2 |
|---|---|---|---|---|---|---|---|---|---|---|---|---|
| Roll | Heading | - | dp2 | Linear | Turning | 0.8 | 8 | 6 | - | - | - | - |
| Acceler Lateral | Heading | Ground-speed | dp2*p3 | Linear | Ground | 0.4 | 0.01 | 0.002 | 0.1 | -0.1 | - | - |
| Gear (R) Down | Gear (L) Down | - | - | Discrete | Ground | 0.9 | - | - | - | - | 1 | 1 |
| Gear (L) Down | Altitude Radio | - | - | Variable-Discrete | Ground | 0.85 | - | - | - | - | 1 | ≤0 |

FIG. 19

FLIGHT DATA MONITORING AND VALIDATION

BACKGROUND OF THE INVENTION

1. Field of the Invention

The present invention relates to flight data monitoring methods and systems.

2. Description of the Prior Art

For many years, commercial and military aircraft (including helicopters) have been required by law to carry a Flight Data Recorder (FDR), often referred to as a "black box", to record certain system parameters. Initially this was so that if an aircraft crashed, then investigators could use the recorded data to find out why the crash happened. The recorder is commonly located in an area of the aircraft where it is most likely to survive the crash, for example the tail.

However, later the idea of using the recorded data to prevent accidents (as well as investigate them) grew. One drawback was the location of the FDR, which was not easy to access. Therefore, a quick access recorder (QAR) was introduced. The QAR records the same information as the FDR but is located where the maintenance crew can easily access the recorder to download the recorded flight data.

Flight data from a flight data recorder or quick access recorder may monitored to identify various events of interest, for example safety-critical events in which a given flight parameter goes beyond known safe limits.

SUMMARY OF THE INVENTION

According to a first aspect of the present invention, there is provided a computer-implemented flight data monitoring method comprising:

receiving input flight data;

performing flight data validation on the input flight data to generate validated flight data; and performing flight data analysis on the validated flight data to detect at least one predetermined type of flight event.

The inventors of the present technique recognised that input flight data obtained from a flight data recorder or quick access recorder is often of poor quality and so can trigger many false positive detections of flight events. For example, as many as two thirds of the detected events may turn out to be caused by glitches and problems with the recorder rather than problems with the aircraft or the way in which the aircraft has been flown. Therefore, during flight data monitoring much time can be wasted in processing invalid flight events.

To address this problem, flight data validation of the input flight data is performed before performing flight data analysis on the validated flight data. The flight data validation performs cleaning of the input flight data, and the flight data analysis then uses the cleaned data to detect the flight events. This reduces the number of false positive detections of flight events, allowing further investigation of the detected flight events to focus on real events, reducing or avoiding time spent investigating invalid events.

The input flight data may comprise a set of parameters sampled at time intervals providing a series of data values for each parameter. For example, measured parameters may include aircraft heading, pressure or radio altitude, air temperature, acceleration in various directions, whether the landing gear is up or down, the extent to which flaps have been activated, and many other kinds of parameter. The sampling rate does not have to be the same for each type of parameter. For example, it may be desired to sample different parameters with different sampling rates depending on how frequently each parameter is expected to change.

The flight data validation may identify invalid data values in the input flight data. For example, within a set of otherwise reliable data values for a particular parameter, there may be some data values which do not make sense in the context of other data values for that parameter or for other related parameters. For example, there may be an erroneous spike in the data values, or an impossible data value may appear that lies outside the possible range of values for that parameter. The flight data validation may identify the invalid values so that they may be excluded from the flight data analysis to reduce the likelihood that erroneous events are detected based on invalid data.

The flight data validation may also identify a parameter of the input flight data as an invalid parameter. In this case the entire parameter is deemed to be invalid, rather than just isolated data values for that parameter. For example, during a flight certain parameters would be expected to change (for example, altitude). If no change is detected, then the values for that parameter may be considered invalid. Similarly, other tests may determine that the values measured for a given parameter are unreliable and cannot be trusted. The flight data analysis may exclude any parameter identified as invalid in the flight data validation, so that only parameters which are deemed to be reliable are considered during the analysis.

There are different ways in which data values or parameters can be identified as invalid. For instance, data values or parameters may have an associated validity flag indicating whether the data value or parameter is valid or invalid. Also, a separate validity report may be provided which the flight data analysis uses to determine whether certain parameters or data values should be analysed. The report may also highlight which parameters have failed, enabling the analyst(s) to directly investigate faulty parameters on a priority basis.

The data values or parameters which have been excluded from the flight data analysis may still be accessible to a flight data analyst who analyses the results of the flight data analysis. For example, the flight data analysis may be performed initially using just the valid data, but the analyst may then view the invalid data separately or select to view events detected based on invalid data as well, so that the analyst may verify that the validation has been performed correctly.

The flight data validation may also produce a validation report which indicates the validity of the input flight data. For example, the validation report may indicate which data values or parameters have been identified as invalid and which validation tests have been failed by the invalid data or invalid parameters. This can be useful for identifying systematic problems with the flight data recording system which need to be repaired.

The flight data validation may comprise many different validation tests for testing the validity of the input flight data. These tests may be applied in different combinations and different orders.

For example, the flight data validation may include a repeating pattern test for detecting occurrences of a repeating signal pattern in data values of a parameter of the input flight data. ARINC®-429© is the technical standard used on the data bus for commercial aircraft. An ARINC®-429© bus often is used for transferring data from the aircraft sensors and control system to the flight data acquisition unit. Signals transmitted using an ARINC®-429© bus often contain a repeating pattern which is generated when no real flight data is being output via the bus. For example, sensors for sensing the airspeed of the aircraft are often not sensitive enough to record the airspeed when the speed is less than 40 knots. As a result no real flight data is recorded when the speed is low and so during these periods the ARINC®-429© patterns are recorded in the flight data. The ARINC®-429© bus contains a "non-computation flag" indicating when the data transmitted is not valid flight data. As a result, the data acquisition unit generates the repeating pattern. By performing the repeating pattern test, the patterns can be identified and masked so that they are not analysed by the flight data analysis.

Also, the flight data validation may include a spike detection test for detecting spikes in the data values of a parameter of the input flight data. A spike can be detected based on the rate of change of the data values from sample to sample. A spike is usually indicative of an error and so can be identified as invalid. The data values corresponding to the spikes can then be masked in the validated flight data so that they do not trigger events during the flight data analysis.

The flight data validation may also include a range comparison test for determining whether data values of a parameter of the input flight data are within a predetermined range. For example, certain parameters may have a range of allowable values, which is not possible for real data values to exceed. If a data value is detected outside the allowable range, it can be marked as invalid. The values outside the range can then be masked during the analysis so that they do not trigger an event.

A correlation test may also be included in the flight data validation, for determining a degree of matching between an actual relationship between two or more parameters of the input flight data and an expected relationship between the two or more parameters.

According to another aspect of the present invention, there is provided a flight data validation method, comprising:

receiving flight data comprising a set of parameters sampled at time intervals providing a series of data values for each parameter;

obtaining, from a configuration file, an expected relationship between two or more parameters of the received flight data;

determining a degree of matching between the expected relationship and an actual relationship between the two or more parameters of the received flight data; and generating result data based on the determined degree of matching.

It will be appreciated that certain relationships between specific parameters of flight data can be expected to be correlated. For example, as the pressure altitude measured by the aircraft instrumentation increases, it can be expected that the radio altitude will increase also. Similarly, as the altitude (pressure or radio) is seen to increase, a decrease in the measured air temperature could be expected due to the lower temperatures experienced at higher altitudes. If such an expected relationship is not present in the received flight data it can be inferred that one or more of the parameters include faulty data which cannot be trusted in assessing the operational performance of the aircraft. In this way, the known kinematics of the aircraft and its operation in flight can be used to identify faulty data in the flight data recorder.

The determining of the degree of matching may comprise determining a degree of correlation between the two or more parameters using a correlation equation selected in dependence on the expected relationship. It will be appreciated that different relationships can be expected between certain different parameters, and each of these relationships can be expressed as a correlation equation which can be solved to determine whether the correlation between the parameters is as could be expected.

The correlation test or step of generating result data may indicate a fail result for one or more of the two or more parameters if the determined degree of correlation is outside a predetermined range.

The determination of the degree of matching may comprise determining a regression line for the actual relationship between the two or more parameters and determining whether one or both of the gradient and offset of the regression line are within a predetermined range. It will be understood that an expected gradient value and offset value along with permitted tolerances for each can be stored, and that the actual gradient and offset can be compared against the stored expected values and tolerances to determine whether the parameters are sufficiently correlated to be assumed valid. During the process of computation it may be assumed that the parameters against which a test parameter is tested, also known as reference parameters, are already valid and have passed previous stages of validation. A fail result may be generated for one or more of the two or more parameters if one or both of the gradient and offset of the regression line are outside of the predetermined range.

The correlation test may further comprise determining, from the configuration file, a flight phase of interest in the flight data; and extracting data values of the flight data corresponding to the determined flight phase of interest from the received flight data. In this way, the expected relationship may relate to a particular flight phase of interest and the degree of matching may be determined based on the actual relationship between the two or more parameters in the extracted data values corresponding to the selected flight phase of interest. This is beneficial because certain relationships are only relevant to a particular flight phase. For example, a relationship between the measured roll of the aircraft and its heading is only relevant in the turning flight phase. Preferably the flight phases associated with the data values are determined only using airspeed, pressure altitude and heading parameters. By keeping the number of parameters used to determine the flight phases to a minimum the likelihood of faulty parameters corrupting the flight phase determination is reduced. In this way the flight phases can be determined even if only these three primary parameters are reliable.

The determining of the degree of matching may comprise pre-processing one or more of the two or more parameters of the received flight data. The pre-processing may comprise differentiating one or more of the two or more parameters. This pre-processing is required for example where a first parameter can be expected to vary along with a rate of change of a second parameter. In another example, the pre-processing may comprise shifting samples of one or more of the two or more parameters with respect to time to compensate for an expected delay between a change in a first parameter and a corresponding change in a second parameter. This pre-processing is required for example where a second parameter can be expected to change as a result of a change in a first parameter, but not immediately. In another example, the pre-processing comprises combining two or more of the parameters to generate a derived parameter. For example, a lateral acceleration of an aircraft could be expected to vary in a relationship with its heading and ground speed. The heading and ground speed can therefore be combined to form a single derived parameter for correlating with the lateral acceleration parameter. A relationship between two or more parameters may not be tested if one or more of the parameters has failed a validation test. This reduces processing requirements, and also reduces the likelihood of a faulty parameter polluting other parameters with which it might be correlated.

The order in which parameters are calibration and correlation tested may be pre-set based on a hierarchy of parameters. In particular, parameters of the flight data may be hierarchically related using a dependency tree in which one or more root reference parameters are defined as a root level in the hierarchy, and in which parameters to be tested are related to one or more of the root reference parameters either directly or via one or more intermediate reference parameters. In this case, relationships between parameters to be tested and one or more direct or intermediate reference parameters are tested in order in a branch of the dependency tree starting with a parameter related only to one or more root reference parameters and progressing to a parameter related to one or more intermediate reference parameters. A relationship between a parameter to be tested and a reference parameter is not tested if the reference parameter has previously failed a validation test.

Other types of flight data validation tests include:
(i) a sampling rate analysis test for determining whether an actual sampling rate of a parameter of the input flight data substantially matches an expected sampling rate for that parameter;
(ii) a change detection test for determining whether a parameter of the input flight data demonstrates an expected change of value;
(iii) a noise detection test for determining whether a noise level of data values of a parameter of the input flight data exceeds a predetermined threshold; and
(iv) an expected value test for determining whether data values of a parameter of the input flight data have an expected value or a value within an expected range.

The flight data analysis may comprise comparing the validated flight data with event thresholds to identify the at least one predetermined type of flight event. The types of event and the thresholds for those events may be defined in an analysis specification. Different analysis specifications may be provided for different aircraft types and different aircraft operators.

The flight data monitoring method may be implemented by a computer or other kind of processing device in different ways. For example, a single software program may be executed by the processing device to perform both the validation of the input flight data and the analysis of the validated flight data. In other examples, two separate programs may be provided, one for validation and one for analysis.

In some cases existing flight data analysis software may be available which does not have a validation function of its own. However, it is possible to reuse this analysis software when implementing the present technique. This can be done by providing flight data validation software, which has at least one validation function for performing a validation test on the input flight data, and a software hook for modifying the functionality of the flight data analysis software so as to link to the flight data validation software. When input flight data is to be processed by the analysis software, the hook may trigger a function call to at least one validation function in the validation software. The validated data is returned by the validation function, and the hook modifies the behaviour of the analysis software so that it analyses the validated flight data instead of the original input flight data. In this way, the present technique can be implemented without needing to make significant changes to the existing analysis software.

According to another aspect of the present invention, there is provided a computer-implemented flight data monitoring system for monitoring input flight data, the flight data monitoring system comprising:

flight data validation circuitry configured to perform data validation processing on the input flight data to generate validated flight data; and flight data analysis circuitry configured to analyse the validated flight data to detect at least one predetermined type of event.

The flight data validation circuitry and flight data analysis circuitry may both be implemented using a single processing device (e.g. a computer) which executes one or more programs for performing the validation and analysis. Alternatively, different devices may be used as the flight data validation circuitry and the flight data analysis circuitry.

According to another aspect of the present invention there is provided a flight data validation system, comprising:

logic for receiving flight data comprising a set of parameters sampled at time intervals providing a series of data values for each parameter;

logic for obtaining, from a configuration file, an expected relationship between two or more parameters of the received flight data;

logic for determining a degree of matching between the expected relationship and an actual relationship between the two or more parameters of the received flight data; and logic for generating result data based on the determined degree of matching.

According to another aspect of the present invention there is provided a flight data validation method, comprising:

receiving flight data comprising a set of parameters sampled at time intervals providing a series of data values for each parameter;

processing, at a first validation stage comprising one or more first stage validation tests, the data values associated with each of the parameters, determining a pass or fail condition for each parameter based on the first stage validation tests, and generating first stage result data;

processing, at a second validation stage comprising one or more second stage validation tests, the data values associated only with parameters for which a pass condition was determined at the first validation stage, and generating second stage result data; and generating a validation report comprising the first stage result data and the second stage result data.

The flight data validation may be performed in two stages: a first validation stage comprising one or more first stage validation tests which determine a pass or fail condition for each parameter, and a second validation stage comprising one or more second stage validation tests which only test the parameters which have passed the first stage of validation test(s). A validation report may be generated comprising the results of the first and second stages.

By separating the validation process into two stages, the second stage validation tests can operate only on data satisfying certain basic criteria. This reduces the likelihood of the second stage validation tests producing erroneous results based on poor quality data, and reduces the amount of processing required because certain parameters containing invalid data will already have been filtered out. This is particularly beneficial for the expected case where at least some of the second stage validation tests are substantially more computationally intensive that the first stage processing tests. Disposing of as many faulty parameters based on the simpler and computationally less intensive first stage processing stage tests is therefore highly beneficial in terms of processing efficiency.

The first stage result data may comprise an indication of a failure state in relation to those parameters having data values which failed one or more of the first stage validation tests. The second stage result data may comprise an indication of a failure state for those parameters which failed one or more of the second stage validation tests. Part of a data validation process is not simply determining which data or parameters are valid and which are not, but also identifying the extent to which the data or parameters are valid and potentially how they are invalid. This information may be valuable for diagnostic purposes.

The first stage validation tests may comprise a sampling rate analysis test for determining whether an actual sampling rate of a parameter of flight data substantially matches an expected sampling rate for that parameter. This is important as the correct sampling rate for a given parameter is a regulatory requirement. If an incorrect sampling rate is detected in such a case then the parameter will be deemed invalid and thus rejected. The first stage result data may indicate whether or not the actual sampling rate of a parameter of flight data substantially matches the expected sampling rate for that parameter. If the sampling rate analysis test determines that the actual sampling rate of a parameter of flight data does not substantially match the expected sampling rate for that parameter, subsequent first stage validation tests are not executed. In this way, the processing burden on subsequent first stage validation tests is relieved. In one example, the sampling rate analysis test is conducted in relation to a single flight and comprises the steps of:

identifying a duration corresponding to the flight;
calculating an expected number of samples for the flight from the identified flight duration and the expected sampling rate; and
comparing the calculated expected number of samples with the actual number of samples corresponding to the flight duration in the flight data;
wherein the actual sampling rate of the parameter of flight data is determined to substantially match the expected sampling rate for that parameter if the calculated expected number of samples substantially matches the actual number of samples in the flight data.

The first stage validation tests may comprise a change detection test for determining whether a parameter in the flight data demonstrates an expected change in value. This test is based on the fact that certain parameters may be expected to change during the course of a flight. For example it can be expected that the airspeed would change. For such a parameter a lack of such a change would indicate faulty data. The first stage result data may be set to indicate whether or not the parameter of flight data demonstrates an expected change in value.

If the change detection test determines that the parameter of flight data does not demonstrate an expected change in value for that parameter, subsequent first stage validation tests may not be executed. In this way, the processing burden on subsequent first stage validation tests is relieved.

The change detection test may comprise the step of determining whether a change in the parameter is expected in dependence on a change flag in the flight data associated with the parameter of flight data. In this way, a parameter now showing a change is only rejected if the change flag indicates that a change is expected.

The first stage validation tests may comprise a range comparison test for determining whether the data values of a parameter in the flight data are within a predetermined range. This range would be set to exclude values which should be impossible for the aircraft to exhibit, but may extend beyond the normal operational envelope of the aircraft. The first stage result data may be set to indicate whether or not the data values of a parameter in the flight data are within the predetermined range. In particular, if a data value is not within the predetermined range, the data value may be marked as invalid.

The first stage validation tests may comprise a spike detection test for determining whether a parameter in the flight data comprises one or more spikes in its data values. The first stage result data may be set to indicate whether or not the parameter in the flight data comprises one or more spikes in its data values. In particular, if a group of one or more data values are determined to be a spike, the group of one or more data values is marked as invalid.

It will be appreciated that a small number of data spikes or out of range values in the data may merely reduce the amount of data which is useful, without necessarily invalidating the parameter entirely. Accordingly, in one embodiment there is provided a step of determining whether the proportion of data values for the parameter which are marked as invalid is greater than a predetermined threshold value. If the proportion of data values for the parameter which are marked as invalid is greater than the predetermined threshold value, a fail condition is generated for the parameter. The fail condition may be indicated in the first stage result data.

It will be appreciated that the first stage validation tests could be conducted in a different order. Further, in some cases certain of the sampling rate analysis test, the change detection test, the range comparison tests and the spike detection test could be included in the second processing stage rather than the first processing stage.

The second stage validation tests may comprise a noise detection test for determining whether a noise level of data values of the parameter exceeds a predetermined threshold. The noise detection test may be conducted separately for each of a plurality of flight phases, which may be subject to differing noise conditions. If the noise level of data values for the parameter exceeds the predetermined threshold, subsequent second stage validation tests may not be executed. In this way, the processing burden on subsequent second stage validation tests is relieved. Furthermore, this prevents the noisy parameter from polluting the results of the subsequent second stage validation tests.

The second stage validation tests may comprise an expected value test for determining whether data values of the parameter have an expected value or a value within an expected range. The second stage validation tests may also comprise an expected value test for determining whether data values of the parameter have an average value within an expected range. It will be appreciated that the expected range for the first of these expected value tests is likely to be wider than the expected range for the second of these tests. This is because the first test effectively looks for isolated large deviations from the expected value whereas the second test effectively looks for systematic or more frequent smaller deviations from the expected value. The expected value test is likely to be conducted separately for each of a plurality of flight phases, since the expected values are likely to differ depending on the flight phase. If the expected value has failed, subsequent second stage validation tests may not be executed.

The second stage validation tests may comprise a correlation test for determining a degree of matching between the expected relationship and an actual relationship between the two or more parameters of the received flight data. The correlation test may be as described in more detail below.

A step of detecting repeating ARINC®-429© signal patterns in data values of a parameter, and marking the data values corresponding to any detected repeating ARINC®-429© signal pattern as invalid may also be provided. This is intended to inhibit repeating ARINC®-429© signal patterns from causing erroneous results or fail conditions in subsequent tests. Typically the ARINC test would be conducted between the change detection test and the range comparison test of the first processing stage.

The flight phases associated with the data values may be determined only using airspeed, pressure altitude and heading parameters. As explained above, by keeping the number of parameters used to determine the flight phases to a minimum the likelihood of faulty parameters corrupting the flight phase determination is reduced. In this way the flight phases can be determined even if only these three primary parameters are reliable.

Further aspects of the invention may include a computer program for causing a computer or a group of computers to execute the above methods, and a recording medium for storing the program.

It will be appreciated that features of the above-described aspects and embodiments of the invention may be combined with features of other aspects and embodiments of the invention as appropriate and in combinations other than those explicitly set out. For example, optional features of the first aspect of the invention may equally optionally be incorporated in embodiments according to other aspects of the invention, for example where the different aspects have corresponding features.

BRIEF DESCRIPTION OF THE DRAWINGS

Example embodiments of the present invention will now be described with reference to the accompanying drawings in which like parts have the same designated references and in which:

FIG. 16 schematically illustrates an example calibration configuration file;

FIG. 19 schematically illustrates an example correlation configuration file;

DESCRIPTION OF EXAMPLE EMBODIMENTS

Figure 1:
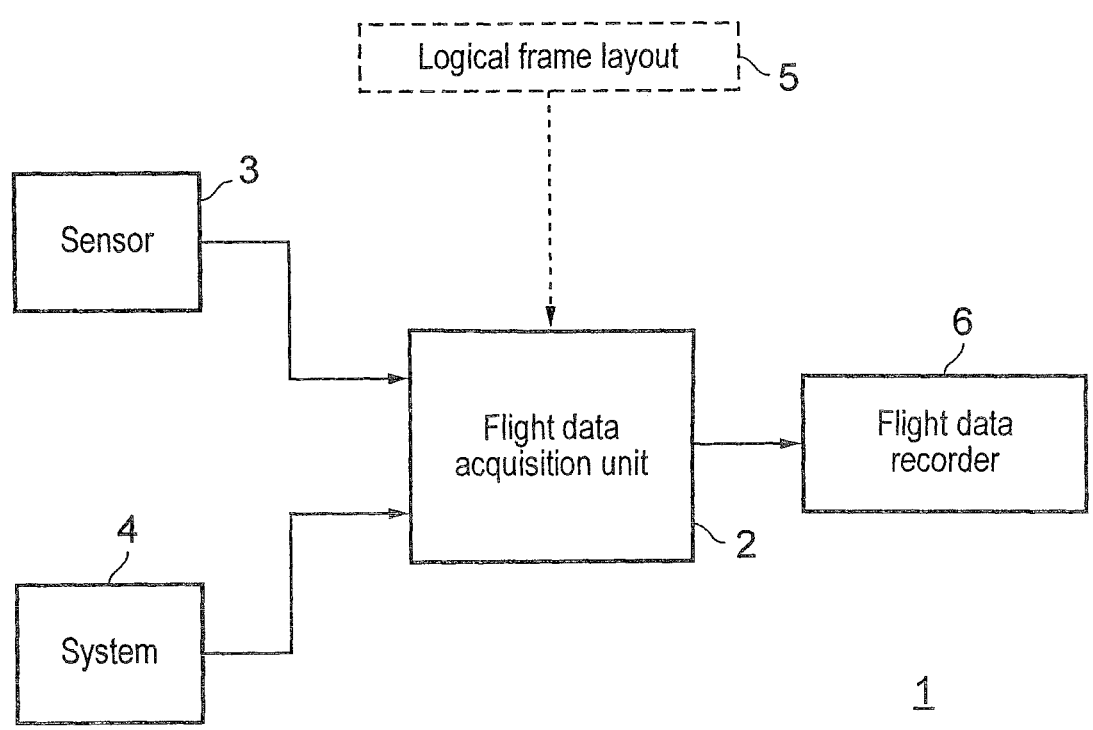
FIG. 1 is a schematic block diagram of an example flight data recorder or quick access recorder setup as would be provided on a commercial aircraft.

Referring to FIG. 1, an on board flight data recording system 1 is shown. The flight data recording system 1 is fitted to an aircraft to provide "black box" functionality. The flight data recording system 1 comprises a flight data acquisition unit 2 which receives inputs from a sensor 3 (only a single sensor is shown here for the sake of clarity and brevity, but it will be appreciated that multiple sensors can and are likely to be present) and the aircraft systems 4. The flight data acquisition unit 2 is programmed to sample and acquire particular flight data from the sensor 3 and the system 4 based on a logical frame layout 5. The sampled flight data is then stored on a flight data recorder (or quick access recorder) 6. In the remainder of this application, references to "flight data recorder" should be understood to include a quick access recorder.

The sensor 3 may measure airspeed, outside temperature, or pressure for example. The inputs from the aircraft systems 4 may be status signals from the navigation system or collision avoidance system for example. The logical frame layout 5 may specify the parameters which are to be sampled, and the sampling interval for those parameters. It will be understood that different flight parameters may be sampled at different intervals/frequencies. The flight data recorder 6 may record onto tape or solid state memory and be designed to meet crash worthiness requirements and can either be removed from the aircraft for data testing or provide a data output which permits data to be transferred to a hand-held download unit when required. As will be appreciated, the flight data is acquired and stored through various flight phases of the aircraft (taxiing, take-off, ascent, cruising, descent, final approach and landing), and may be collected over a number of flights over an extended period of time; the typical minimum recording duration of a flight data recorder being twenty five (25) flying hours.

Figure 2A:
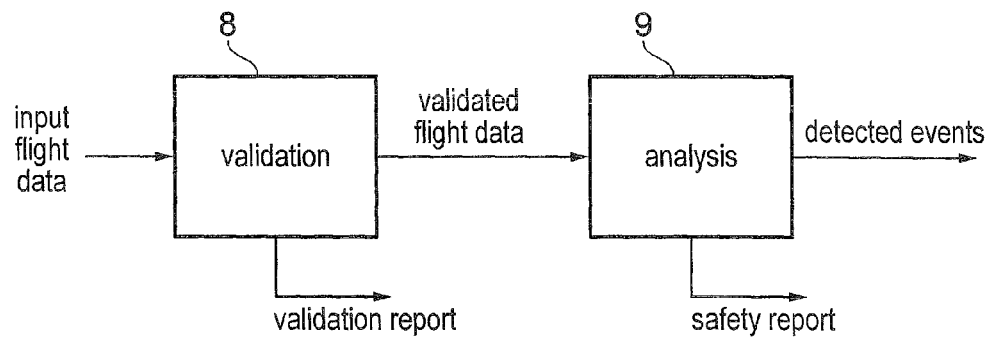
FIG. 2A schematically illustrates an example of a flight data monitoring system for monitoring flight data from the recorder of FIG. 1.

The acquired flight data is to be processed to determine both that the aircraft is functioning correctly and that the flight data recording system 1 is itself collecting and storing flight data correctly. FIG. 2A illustrates an example of a flight data monitoring system according to the present technique. The flight data downloaded from the recording system 1 is input to validation circuitry 8 as input flight data. The validation circuitry 8 performs validation processing on the input flight data to generate validated flight data. The validation processing cleans up the input flight data, which may be noisy or unreliable. For example, the validation processing may mask invalid data values or parameters. A validity flag may be used to identify the invalid data values or parameters.

The validation circuitry 8 also generates a validation report indicating the validity of the input flight data. For example, the validation report may indicate which data values or parameters have been identified as invalid and why. This can be useful to help to identify when repairs to the recording system 1 are needed. Also, from an analysis perspective, it helps analysts to directly investigate the parameters that have failed the tests and make necessary suggestions to customers.

The validated flight data is then analysed by analysis circuitry 9, to detect various events of interest. The analysis circuitry 9 may maintain an analysis specification which identifies the events to be detected and the triggering conditions for those events. The analysis circuitry 9 may also generate a safety report listing any safety-critical events which have occurred. At least the safety-critical events, and optionally also other events, may be passed to a human analyst for further investigation. Data values or parameters which are identified as invalid by the validation processing are excluded from the analysis so that they do not trigger invalid events.

While FIG. 2A shows an example in which distinct validation circuitry 8 and analysis circuitry 9 are provided, in other examples the flight data monitoring system may be implemented on a single processing device programmed to perform the validation and analysis processing.

Figure 2B:
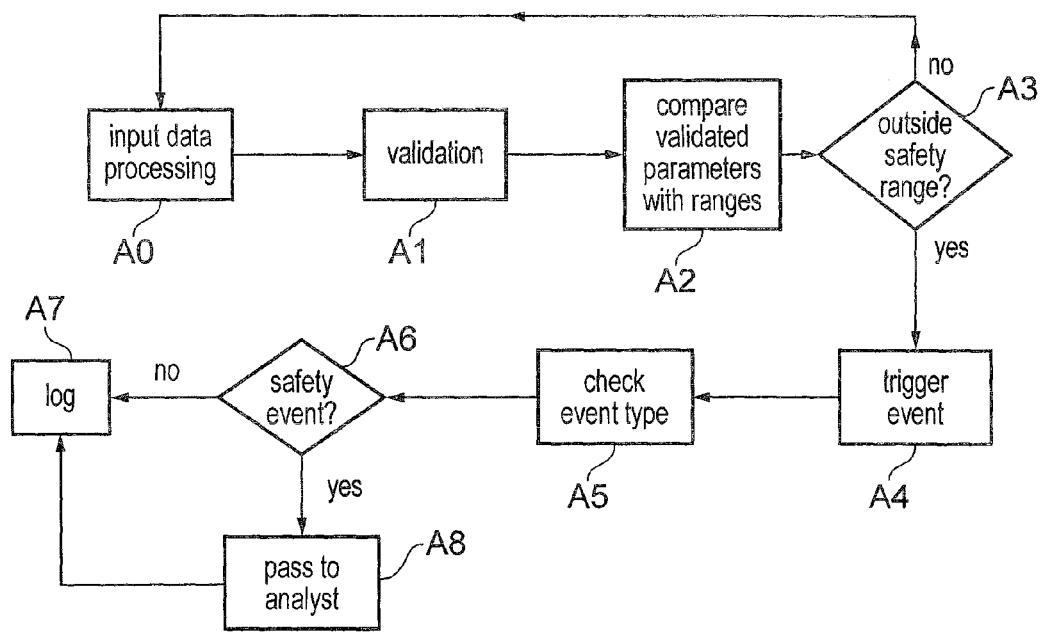
FIG. 2B is a schematic flow diagram of an example of a flight data monitoring method including validating and analysing flight data.

Referring to FIG. 2B, an example method of pre-processing and analysing flight data from a flight data recorder for the purpose of safety event monitoring is shown. At a step A0, flight data is received at a data processing apparatus, for example a suitably programmed personal computer or dedicated hardware rig, and processed into a format which permits flight data parameters to be subject to range-based validation and to be understood by a user. For example, the flight data may be processed from a raw binary or hexadecimal form into a format whereby parameters of flight data are presented sequentially with respect to time as suitable engineering data units (e.g. knots or feet). The flight data may be obtained by direct electrical connection to the recorder, by way of removable recording medium from an external storage device (e.g. DVD or hard disk) provided by the aircraft operator, or from a remote device via a communication network (e.g. the Internet).

At step A1, the input data is subjected to data validation processing by the validation circuitry 8. The validation processing may include one or more validation tests which will be described in more detail below.

At a step A2, for each parameter being analysed the analysis circuitry 9 compares the validated flight data samples for the parameter with one or more ranges set in the event specification for that parameter. Invalid samples or invalid parameters are generally excluded from the analysis at this point. However, in some embodiments the user of the system may optionally select whether or not to include the invalid samples or parameters in the analysis. This can be useful to allow the user to compare the analysis of all samples and parameters with the analysis of only the valid samples and parameters, to check the effect of the validation.

At a step A3, if it is determined that the samples are not within any of the set ranges, then no event is triggered and so the procedure will return to the step A0 for the next parameter in turn.

If some samples of data fall outside any of the safety ranges being tested, then the procedure moves on to a step A4, where an event corresponding to the range is triggered. At a step A5, an event type of a detected event is determined. The event type may either be an event which relates to the safety of the aircraft, for example if the parameter is a critical flight parameter, or an event which does not relate to the safety of the aircraft, for example if the parameter is not a critical flight parameter. At a step A6, if the event is not a safety event then the event is merely logged at a step A7 without any operator input being required. If on the other hand it is determined at the step A6 that the event is a safety event, then the event is flagged to pass to a human analyst at a step A8.

While step A2 compares values for a one or more parameters individually, it is also possible to trigger an event when data samples for two or more parameters simultaneously meet respective threshold criteria for the event.

Validation System Architecture

Figure 3:
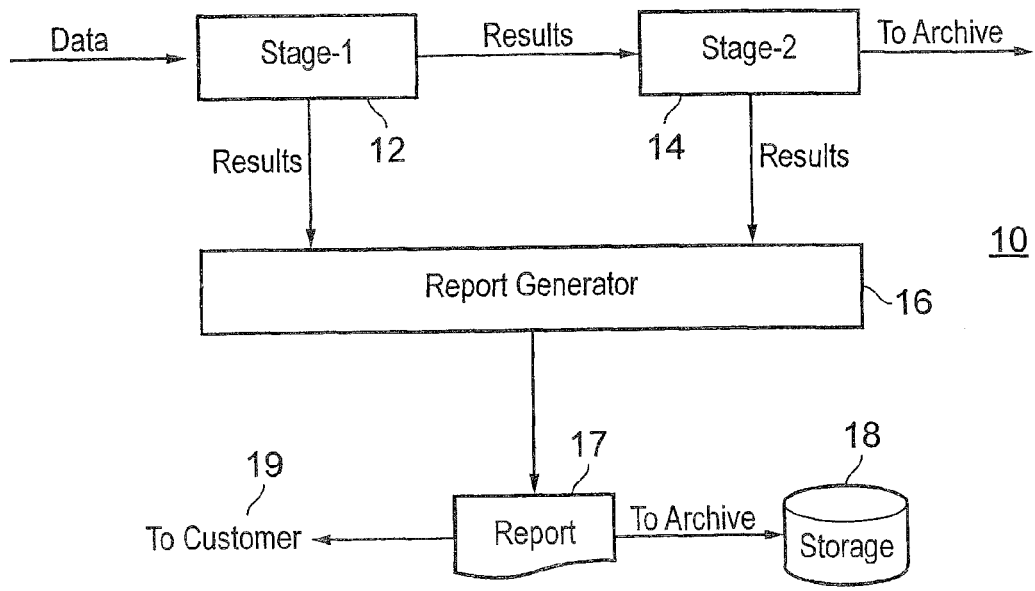
FIG. 3 schematically illustrates a data validation system architecture according to an embodiment.

FIG. 3 shows a top level flow diagram of a data validation system 10 which can be used for the validation circuitry 8. After flight data is transferred to the data validation provider from an airline and is converted into a suitable format (in the manner described in step A0 of FIG. 2), each parameter is processed in two processing stages, a first processing stage 12 and a second processing stage 14. The first processing stage 12 comprises a series of tests which check the following:

That the rate at which the data is sampled matches the expected sampling rate for the parameter (sampling rate);

That parameters which are expected to show a change during the flight actually do so (change detection);

That if the data is of ARINC®-429© type, repeating patterns of values which are invalid are identified as such;

That the parameter data seen is within the operational envelope of the aircraft (min-max); and That no data spikes are present in the data (rate of change).

Figure 4:
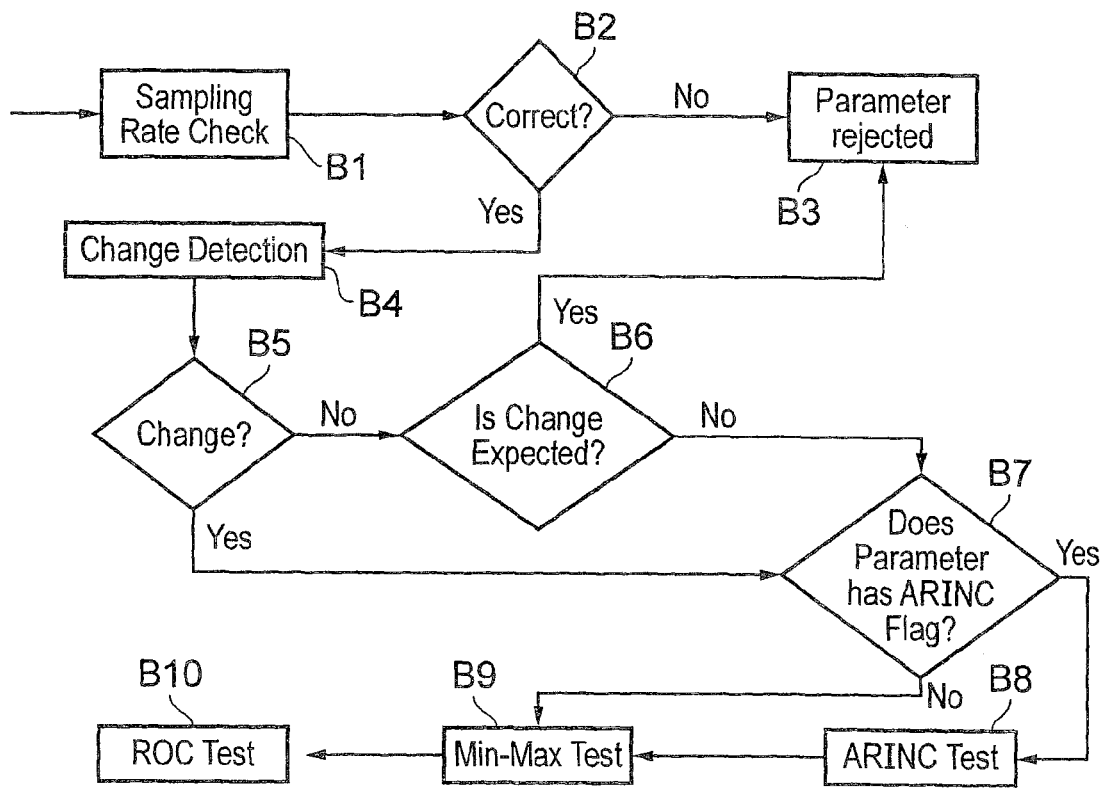
FIG. 4 is a schematic flow diagram of the first processing stage of FIG. 3.

FIG. 4 shows a flow diagram for the stage one tests and highlights the order in which the tests are to be executed. Stage one starts at a step B1, where the sampling rate of a parameter of the flight data is compared with an expected sampling rate for that parameter. If the sampling rate is not determined to be correct at a step B2, then the parameter is rejected at a step B3. If the sampling rate is determined to be correct at the step B2, then the parameter is passed to the change detection test at a step B4. The change detection test determines firstly whether there is a change (with respect to time) in the data samples of the parameter at a step B5. If there has been a change then the process continues to a step B7 (ARINC test), whereas if there has not been a change then the process moves to a step B6, where it is determined whether a change in the data samples of the parameter is expected. If it is determined at the step B6 that a change is expected (and by virtue of the logic flow from B5 to B6 has not occurred) then the parameter is rejected at the step B3. If on the other hand it is determined at the step B6 that a change is not expected, then the process continues to the step B7. At the step B7 it is determined whether or not the parameter has an ARINC®-429© flag associated with it (an explanation of ARINC®-429© is provided below). If the parameter does have an ARINC®-429© flag associated with it then an ARINC®-429© (repeating values) test is conducted at a step B8, and then a Min-Max test is conducted at a step B9 to determine if the data samples for the parameter fall within the operational envelope of the aircraft. If at the step B7 it is determined that no ARINC®-429© flag is associated with the parameter then the process proceeds directly to the step B9 where the Min-Max test is conducted. Following the Min-Max test, a rate of change test is conducted at a step B10 to identify data spikes within the data set for the parameter. It will be appreciated from FIG. 4 that the sampling rate test and the change detection test may lead to the immediate rejection of a parameter, while the ARINC test, Min-Max test and rate of change test do not. The reasons for this will be explained in detail below.

Parameters which have been rejected may be marked as invalid so that they are not analysed to detect flight events.

Parameters which pass the tests of the first processing stage 12 are then passed to the second processing stage 14. The second processing stage 14 comprises the following tests:

Expected Values Check
Noise analysis;
Calibration Check; and
Correlation check

Figure 5:
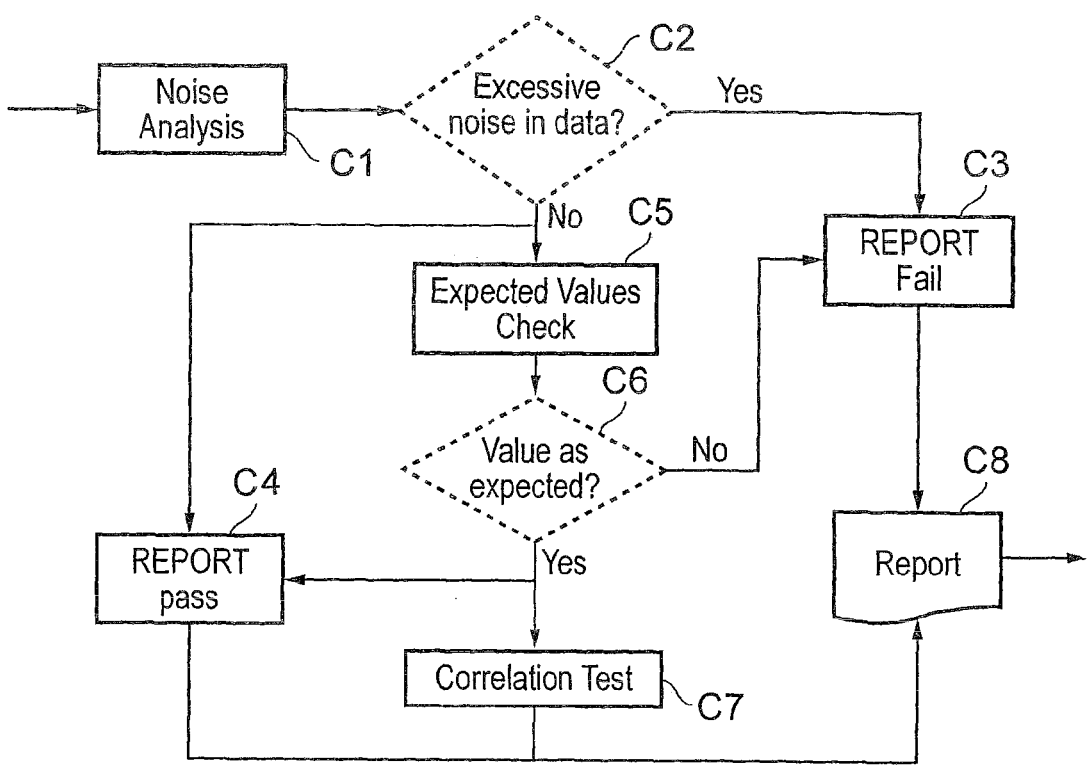
FIG. 5 is a schematic flow diagram of the second processing stage of FIG. 3.

FIG. 5 shows a flow diagram depicting the sequence of the stage two tests. The tests of the second processing stage 14 are only run on parameters which successfully pass the first stage of testing at the first processing stage 12. The sequence of the stage two tests starts at a step C1 with noise analysis. If it is determined at a step C2 that there is excessive noise in the data samples for the parameter then a failure report is generated at a step C3. If on the other hand it is determined at the step C2 that there is not excessive noise in the data samples for the parameter then an expected values check is conducted at a step C5, and a pass report in relation to noise conditions is generated at a step C4. If the expected values check at the step C5 indicates that the logic is as expected then a pass report in relation to the expected values check is generated at the step C4. A correlation test is then conducted on the data samples of the parameter with respect to data samples of one or more other parameters at a step C7. If the expected values check at the step C5 indicates that the logic is not as expected then a fail report is generated at the step C3. If the noise and expected values checks are passed, then the correlation check is performed and the pass reports and correlation output are used to generate a report at a step C8. If one or other of the noise check and the expected value check are failed then the fail report is used to generate a report at the step C8, but the correlation check is not performed. This is because the results of the correlation check cannot be relied on if the quality of the data as determined by the noise and logic checks is inadequate.

The results for each test are stored at the end of each stage of analysis and then compiled into a report 17 by a report generator 16. The report 16 is then both archived to a storage device 18 and also made available to the customer 19 via a website based graphical user interface for example.

It will be appreciated that other combinations of validation tests may be used. It is not necessary to execute all of the tests shown in FIGS. 4 and 5—only a subset may be used if desired. Also, the tests may be performed in different orders. For example, the validation may implement the ARINC®-429© (repeating values) test, data spike test, Min-Max test, and correlation test, without implementing the other tests.

Flight Phases

Figure 6:
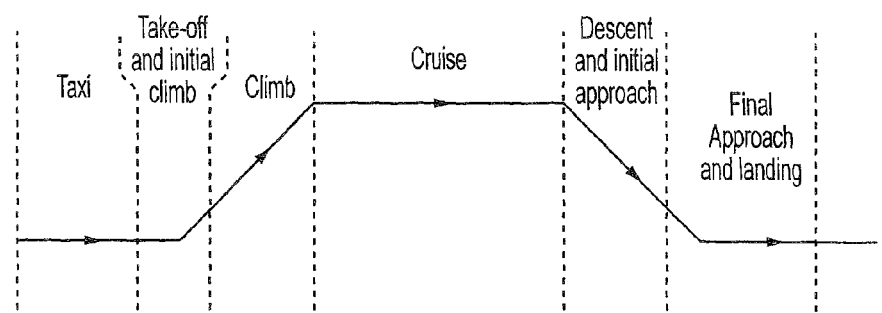
FIG. 6 schematically illustrates the various flight phases of a typical aircraft flight.

Flight phases are primarily used in the second processing stage 14 of FIG. 3, as will be described in detail below. For example, the correlation, calibration, noise and expected value checks of the data validation system 10 may utilise flight phase information heavily. A flight phase refers to a specific period of within a flight. Examples of flight phases are described below and can be seen in FIG. 6 where the arrowed line indicates the altitude of the aircraft.

Each of the phases of flight has its own definition as follows:

Taxi—This phase includes the movement of the aircraft on the ground under its own power.
Takeoff—The point at which the aircraft transitions from moving on the ground to flying in the air.
Climb—The period during which the aircraft increases its altitude.
Cruise—The altitude of the aircraft remains constant (approximately).
Turning (not shown in FIG. 6)—The turning phase indicates that the aircraft is changing heading (the direction in which the aircraft is moving), which can occur either in air or on the ground.
Descent—The portion of flight where the aircraft decreases its altitude.
Landing—The last segment of flight where the aircraft transitions from flying in the air to moving on the ground. This can also be defined as the moment where the landing gear of the aircraft makes contact with the ground.

The flight phases are not included in the flight data stored in the flight data recorder, and instead must be derived from the flight data. All flight phases can be calculated using only airspeed, pressure altitude and heading parameters, as can be understood from the following table.

| Flight Phase | Definition and required parameters |
| --- | --- |
| Taxi | From first change of heading to takeoff or from landing to last change of heading. Uses heading and pressure altitude parameters. |
| Takeoff | After the airspeed increases through 80kts, the point where the rate of climb first exceeds 200 fpm. Uses airspeed and pressure altitude parameters. |
| Climb | Rate of climb greater than 800 fpm. Uses pressure altitude parameter. |
| Turning | Absolute rate of change of heading greater than 1.5 deg/sec. Uses heading parameter. |
| Descent | Rate of climb less than −800 fpm. Uses pressure altitude parameter. |
| Landing | Before the airspeed decreases through 80kts, the point where the rate of climb last falls below −200 fpm. Uses airspeed and pressure altitude parameters. |
| Cruise | Absolute rate of climb less than 300 fpm. Uses pressure altitude parameter. |

Note:
The Rate of climb, measured in feet per minute (fpm) is the rate of change of pressure altitude.

Initial Input Information

The flight data validation system receives two types of input information. The first of these is a parameter data array. The parameter data array contains all the samples of data recorded by the flight data recorder for the parameter that is to be analysed. The second input is the information that is associated with the parameter (metadata). Examples of this information are:

Parameter name
Sampling rate—The sampling rate (in Hz) at which the parameter is recorded by the flight data recorder.
Upper and lower operating limits—These limits are used to detect samples which are outside the operational limits of the aircraft (see min-max algorithm described below for more information).
Rate of change limit—used to detect spikes in the data (see rate of change algorithm described below for more information).
Change flag—Indicates parameters that may not change through the course of the flight (see change detection algorithm described below for more information).
ARINC®-429© flag—used to indicate parameters that need to be checked for ARINC®-429© behaviour (for more information on ARINC®-429©, please see the ARINC algorithm described below).
Length of the flight—used for the sampling rate check for each parameter (for information see the sampling rate analysis algorithm described below).

Flight phase—the phase of flight (such as cruise, turning, climb etc.) to be used in the second stage of analysis for the purposes of noise analysis and correlation.

Noise Limit—the threshold value against which the results of noise analysis are compared.

Expected value limits—used for checking the parameter behaviour during specific phases of flight matches the expected behaviour.

Correlation limit—the threshold below which the parameter is deemed not to relate sufficiently to the independent parameter used in the comparison.

Regression limits—the minimum and maximum levels of the slope of the least squares fit line.

Offset limits—the minimum and maximum value permissible for the offset of the slope of the least squares fit line from its expected position.

Throughout this specification the information listed above shall be referred to generally as parameter information. The data array is processed using the parameter information listed above and the algorithms described below. When the data has been processed, the results are added to a report which is made accessible to the customer via a web based user interface as described above in relation to FIG. 3.

Flight Data Validation Algorithms

The algorithms for the tests mentioned above are described in detail below:

Sampling Rate Analysis

Figure 7:
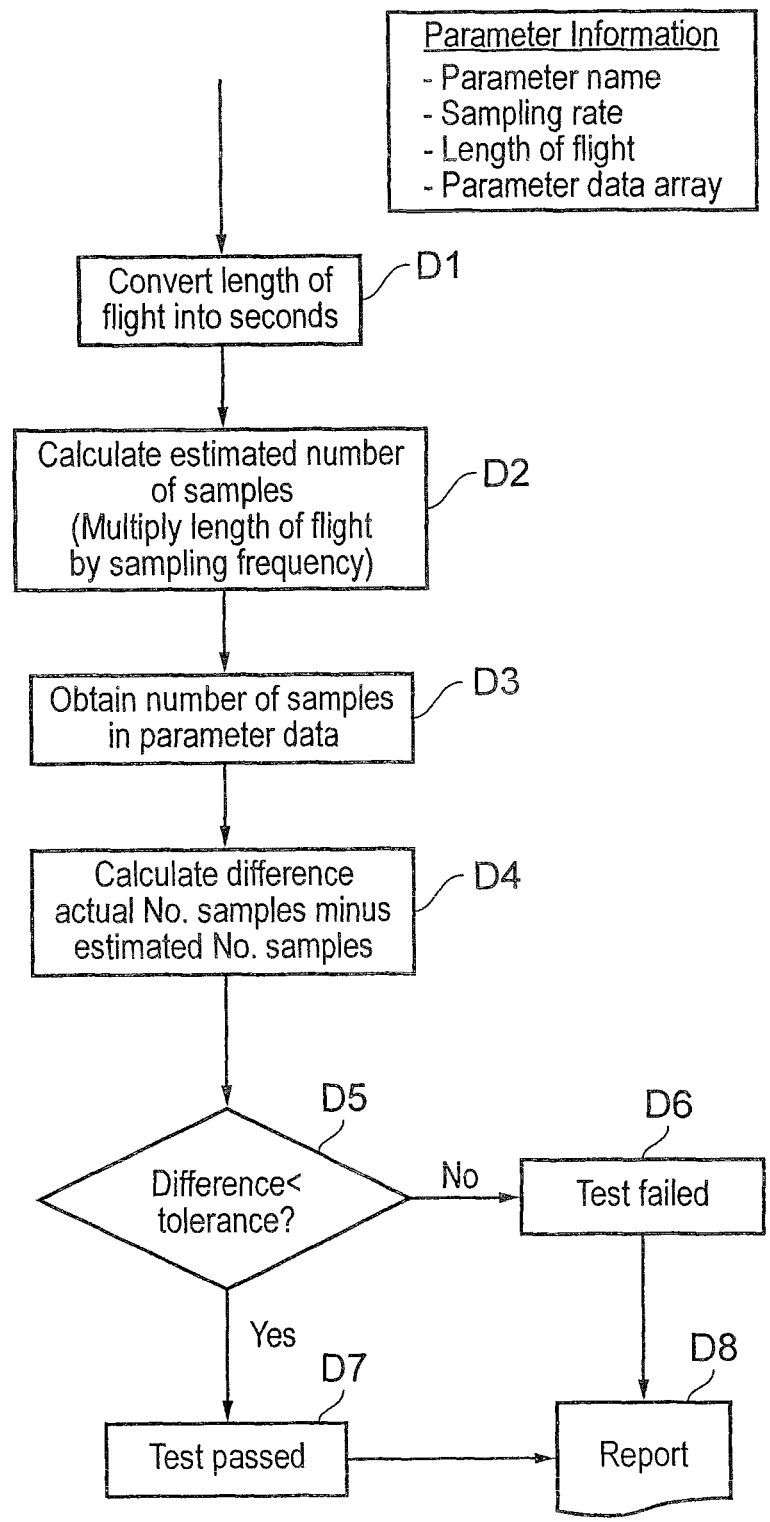
FIG. 7 is a schematic flow diagram of the sampling rate test of FIG. 4.

Parameters may be sampled at different frequencies and it is important that the flight data recorder receives and records information at the correct rate for a particular parameter. The sampling rate test is intended to compare the rate at which the parameter should be recorded with the rate at which it is actually recorded. This is to ensure that the parameters are recording in line with regulatory requirements. FIG. 7 shows a flow diagram for the sampling rate analysis algorithm.

The parameter data is passed into the sampling rate detection algorithm along with its associated information. From the parameter information, the parameter name, sampling frequency (in Hertz (Hz)) and the length of flight are extracted. The length of the flight is first converted from hours, minutes and seconds into seconds only at a step D1. This duration in seconds is then multiplied by the sampling frequency at a step D2. This provides an estimate of the number of samples that are expected based on the duration of flight and sampling frequency. The number of samples in the parameter data array is obtained at a step D3 and the estimated number of samples is subtracted from it at a step D4. At a step D5, it is determined whether the difference between the actual and estimated numbers of samples is within a given tolerance of zero (for example a difference within ±15). If so, then the data is determined to pass the test at a step D7 and a note of this is made in a report at a step D8. The algorithm is designed to allow for drop outs in the data in line with regulatory requirements. The parameter is then passed on to the next stage of analysis. If however the parameter does not pass the sampling rate test (the result of the subtraction at the step D4 is not close to zero) at the step D5, the parameter is determined to have failed the test at a step D6, and a note is made in the report of the failure and the parameter does not pass on to the next stage of analysis. The parameter can be marked as invalid with an invalid flag to prevent it being analysed in subsequent steps.

Change Detection Analysis

There are considered here to be two types of parameters with regard to change detection. Parameters such as altitude and airspeed are expected to demonstrate a change during every flight. However, there are parameters which will only show a change during specific conditions and as a result they may not trigger on every flight. Examples of these include ground proximity warnings, fire alerts and month of the year. The change detection algorithm is used to check parameter data for a change that may have occurred during the flight. Parameters which show a change during the course of the flight pass the change detection test. However, the parameters which do not show a change must be separated into two categories:

(1) Parameter shows no change due to a fault; or
(2) Parameter shows no change because specific conditions were not met during the flight.

The algorithm should be able to distinguish between these two categories of parameters. To prevent the rejection of parameters which have not shown a change during the analysis but may not be faulty, a Change Flag is included in the parameter information. This Change Flag is an indicator that the parameter may not change during the course of the flight. If no change is detected for the parameter but a Change Flag is shown in the parameter information, a note is made in the report. This note informs the customer's engineering team that the parameter has not been seen to change because the relevant conditions have not been met. They must then check the parameter manually to ensure that the sensor that provides data to the flight data recorder is working correctly.

Figure 8:
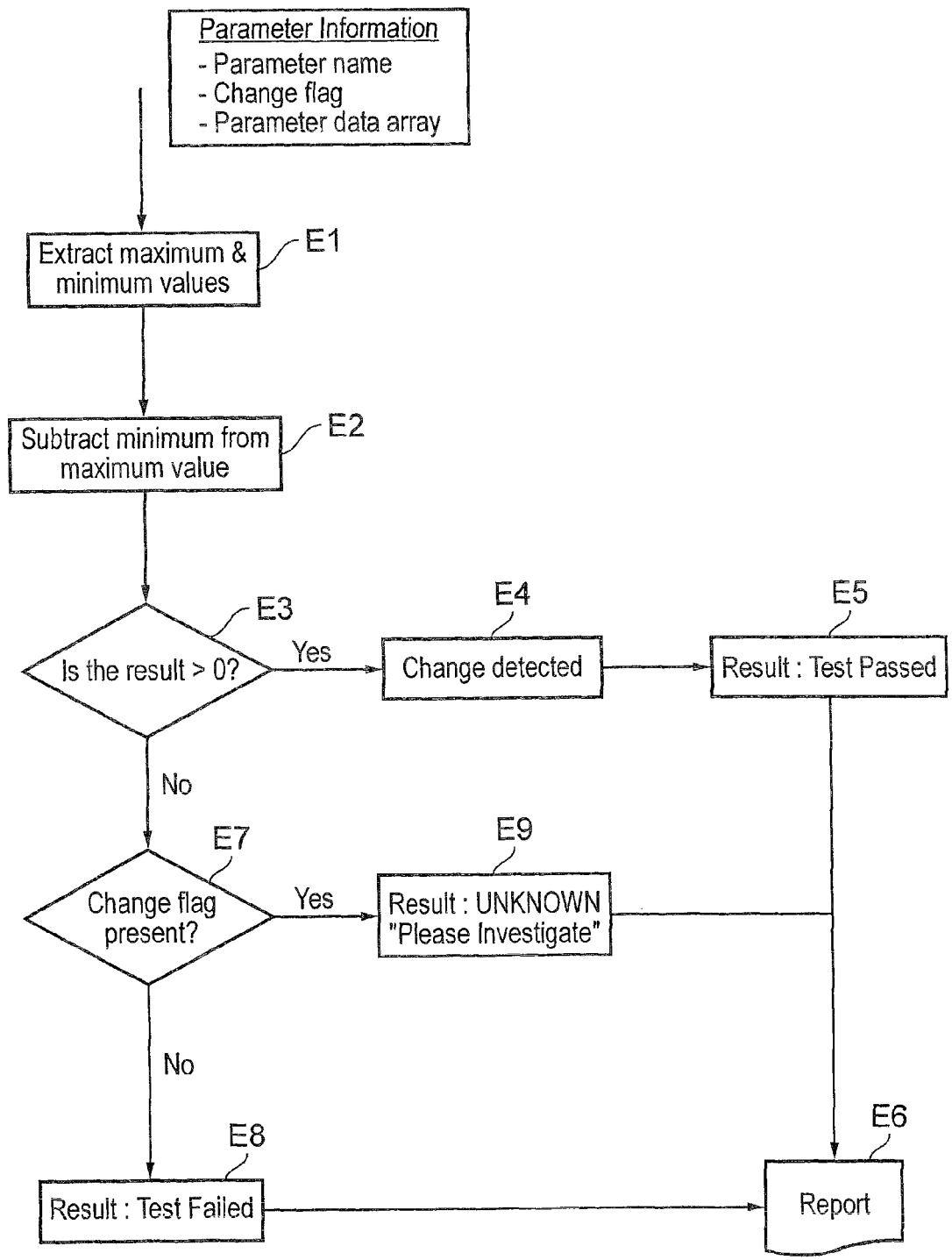
FIG. 8 is a schematic flow diagram of the change detection test of FIG. 4.

A flow diagram of the change detection algorithm can be seen in FIG. 8. The change detection algorithm receives the parameter information of parameter name, change flag and the parameter data array. At a step E1, maximum and minimum values of the sampled data are extracted from the parameter data array. The minimum value is then subtracted from the maximum value at a step E2 and the absolute value is computed. If it is determined at a step E3 that the result of this subtraction is greater than zero, a change is detected at a step E4 and the test is passed at a step E5. A note of this is made in the report at a step E6.

If a parameter shows no change at the step E3 the algorithm looks for the presence of a Change Flag at a step E7. If a Change Flag is present in the parameter information, a note is made in the report at a step E9 informing engineers that this parameter must be checked manually. The parameter does not proceed on to the next stage of analysis. If a flag is not present in the parameter information, the parameter fails the test at a step E8 and it is not analysed by any other algorithms. A note is made in the report of the failure.

ARINC Detection Algorithm

Figure 9:
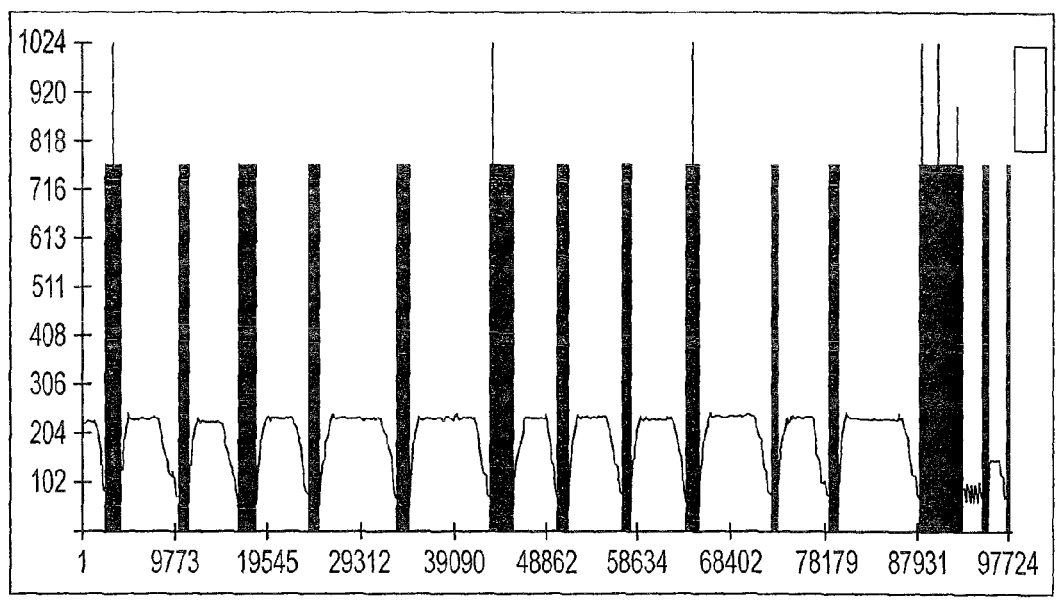
FIG. 9 is a graph showing a typical data plot of the FDR recording illustrating invalid ARINC 429 data.

ARINC®-429© is a technical standard in the aviation industry relating to the avionics data buses on commercial and transport aircraft and helicopters. The standard defines the physical and electrical interfaces for a two wire data bus and the associated data protocol for the network. This is of interest in this particular application because on a large number of aircraft, information is received by the flight data recorder from ARINC®-429© data sources. The ARINC detection algorithm only applies to information obtained from these sources. An example of parameter data received from an ARINC®-429© source can be seen in FIG. 9. The line plot of FIG. 9 shows an airspeed plot for fourteen consecutive flights. The solid black areas contain data with a repeating pattern. Whilst these fourteen sections of flight data may be valid, the repeating pattern data must be filtered. This is to prevent the repeating pattern data from causing false warnings in other algorithms such as the rate of change analysis algorithm.

The pattern of ARINC signals can often vary from parameter to parameter and the validation process should be able to successfully detect and then mask or identify as faulty any ARINC pattern that is found within the data.

The ARINC algorithm consists of two main elements:
(1) A function that dynamically detects any pattern(s) and returns the pattern(s) for use during faulty data detection; and
(2) Marking values that match the pattern(s) detected in step (1) of the analysis as faulty.

Figure 10:
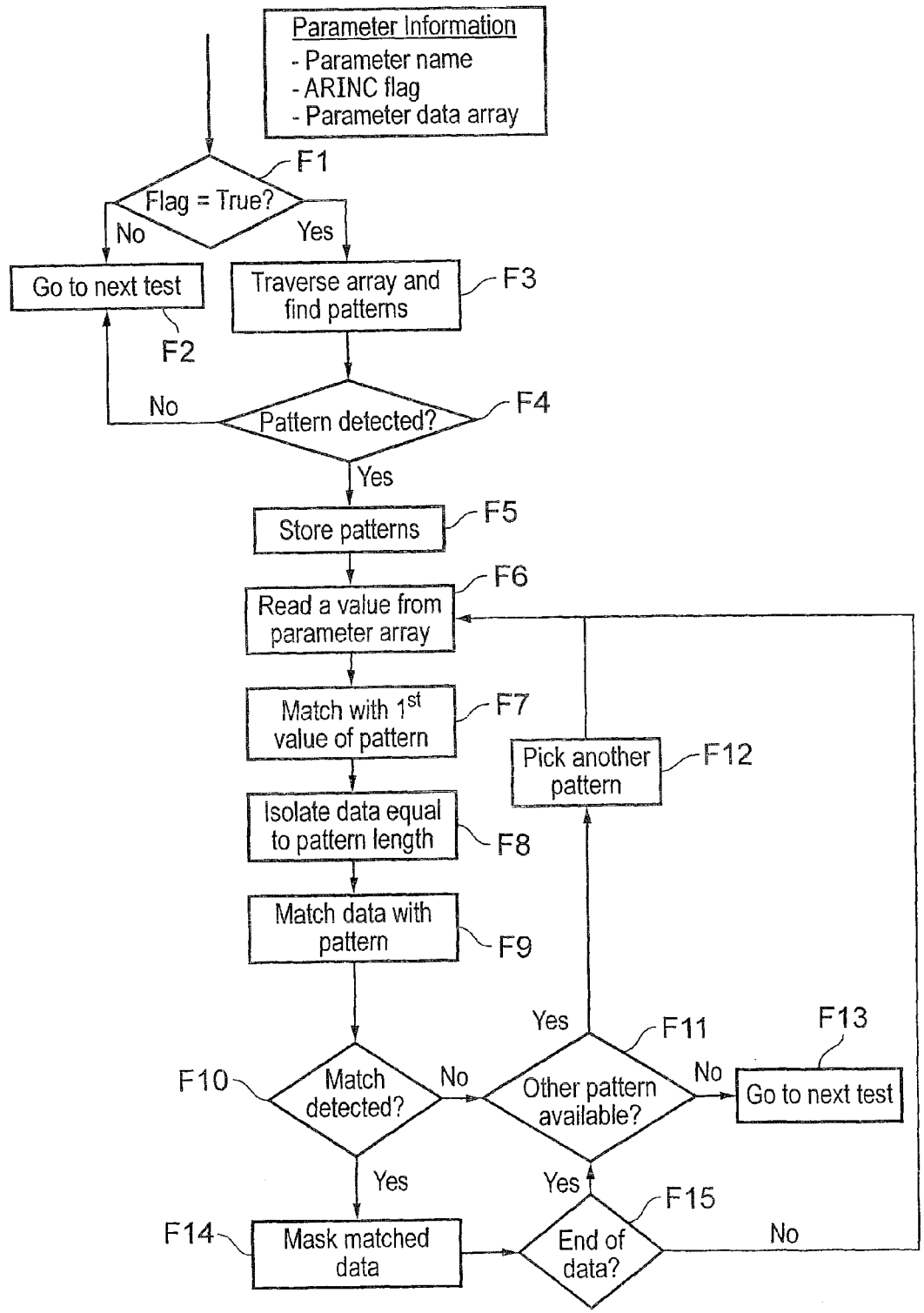
FIG. 10 is a schematic flow diagram of the repeating pattern ARINC®-429© test of FIG. 4.

A flow diagram of the ARINC detection algorithm can be found in FIG. 10. The following subsections describe the main elements of the ARINC algorithm in more detail.

Pattern Detection Algorithm

Figure 11A:
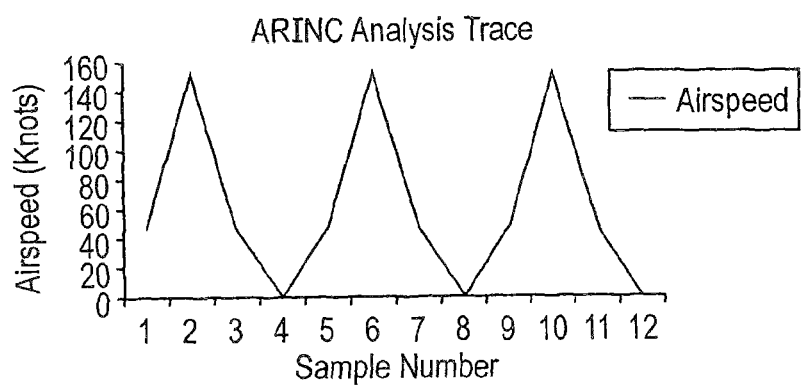
FIGS. 11A and 11B show two example ARINC traces.
Figure 11B:
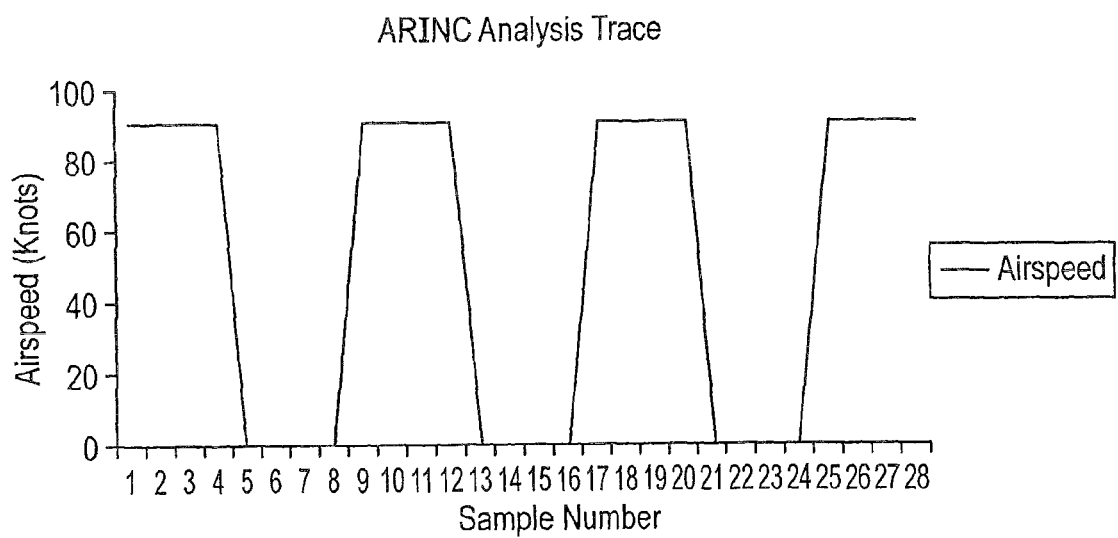

This function receives an array of values for the parameter and an ARINC flag to indicate if the parameter possibly contains an ARINC signal. At a step F1 it is determined whether the ARINC flag is set to true or false. If the ARINC flag is not set to true (i.e. is set to false) then the ARINC test is not continued and the parameter is passed on to the next test at a step F2. If the ARINC flag is set to true then the algorithm dynamically detects a pattern using the following steps:

At a step F3, traverse through the masked array, reading 12 elements at a time and storing it temporarily in memory. Assuming that a signal can either consist of 4 elements or 8 elements, the following checks are carried out at a step F4 in order to find an ARINC pattern:

(1) A set of pattern lengths are determined at the beginning which are either in units of 4, 8 or 16.
(2) The peak to peak value (difference between the maximum and minimum values in the 4 selected elements) is computed to ensure the pattern(s) do not contain flat valid data (e.g. 45, 45, 45, 45).
(3) If elements 1 to 4 are exactly equal to elements 5 to 8 and the set of elements is exactly equal to elements 9 to 12 then the pattern is determined to consist of 4 elements that are repeating. Therefore the first 4 elements are returned as the ARINC pattern. An example of a four element repeating pattern can be seen in FIG. 11A.
(4) If elements 1 to 4 are not equal to elements 5 to 8 but are equal to elements 9 to 12 then the ARINC pattern is classified as an 8 element repeating pattern. The first 8 elements are therefore returned as the ARINC pattern. An example of an eight element repeating pattern can be seen in FIG. 11B.
(5) Flight data can contain multiple ARINC patterns in one signal so it is important that the algorithm be capable of detecting each of these patterns. The signal is reversed and the above steps F3 and F4 are applied again. Any patterns that are detected during this second run are then reversed so that they are in the order that was originally passed into the algorithm.
(6) The detected patterns are then compared and the unique patterns are stored at a step F5 for use by the ARINC validation algorithm.
(7) In order to make sure the data array is divisible by the length of the pattern(s), it is padded with invalid values. These invalid values do not interfere with the correct detection of the pattern and only aligns the length of the data to a factor of the pattern length.
(8) The data array is divided into chunks corresponding to each pattern length and all combinations of the pattern relative to the data are stored. Taking into account all the combinations make the system more robust as often patterns are not recorded in the most efficient manner due to time delay and can therefore be out of step with the original pattern.

ARINC Validation

When validating the ARINC signal, the ARINC pattern(s) detected previously is used to mask or otherwise identify as faulty any values in the parameter data that match the ARINC pattern. This is achieved as follows. At a step F6 a value is read from a parameter array. The read value is then matched with a $1^{st}$ value of a stored pattern at a step F7. At a step F8, data of the parameter array equal to the pattern length is isolated, and is then matched with the stored pattern at a step F9. If a match is detected at a step F10, then the matched parameter data samples are masked (set to zero, null or some other predetermined value) or otherwise identified as faulty at a step F14 to distinguish them from regular data samples. It is then determined at a step F15 whether the end of the data set for the parameter has been reached. If the end of the data set has not been reached then processing returns to the step F6. If the end of the data set has been reached then the process moved to a step F11 where it is determined if other ARINC patterns are available (stored) against which the parameter data needs to be checked. If not then the ARINC detection process terminates and the parameter data is passed to the next test at a step F13. If it is determined at the step F11 that other ARINC patterns are available, then another pattern is picked at a step F12 and then processing reverts to the step F6 where the data set is evaluated against the newly selected pattern. Referring back to the step F10, if a match is not detected, then processing moves on to the step F11. By way of the above technique, ARINC signals can be detected and masked off or otherwise identified as faulty so that they do not disturb subsequent validation testing.

MinMax Algorithm

Figure 12:
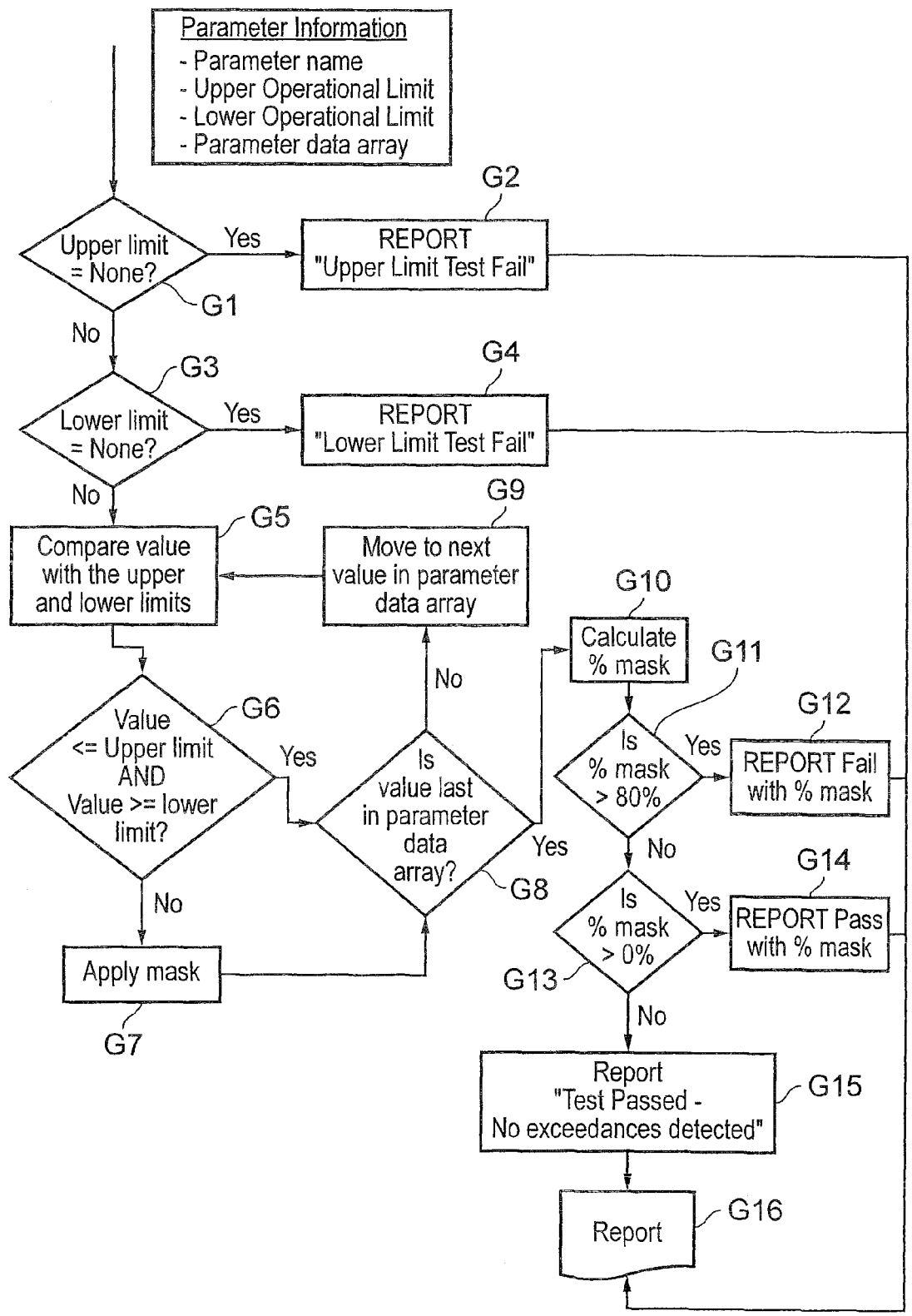
FIG. 12 is a schematic flow diagram of the MinMax test of FIG. 4.

The purpose of the MinMax algorithm is to ensure that the parameter data contains only values that are within or only a little beyond the operational range of the aircraft. It should be appreciated that FDRs are used to examine potentially unsafe events, such as, straying beyond aircraft limits and hence the MinMax test preserves data in such occurrences. A flow diagram representing the MinMax algorithm can be seen in FIG. 12.

Upper and lower operational limits are provided in the parameter information that is fed into the algorithm (in addition to the parameter name and the parameter data array). The algorithm first checks at a step G1 if the upper limit is set to 'None' and at a step G3 is the lower limit is set to 'None'. If either limit is set to 'None' a limit is unavailable for the parameter, and a respective fail report is generated at respective steps G2 and G4. A note of this is made in the report at a step G16 and the parameter moves on to the next test. If both upper and lower limits are available, the algorithm parses through all the values in the parameter data array and compares the value with the upper and lower limits. If the value exceeds either of these limits, the sample is masked or identified as faulty. This process is shown in steps G5 to G9. In particular, at the step G5 a data sample value is compared with the upper and lower limits indicated in the parameter information. At a step G6 it is determined if the value is less than or equal to the upper limit and greater than or equal to the lower limit. If the value does not fall within this range then a mask is applied to that data sample at a step G7 and it is then determined at a step G8 whether the value is the last one in the parameter data array. If the value is determined at the step G6 to fall within the range, then the data sample is not masked and the process moves directly to the step G8. If it is determined at the step G8 that the value under consideration is not the last value in the data array, then at a step G9 the process moves on to the next value in the parameter data array.

Once the last value in the parameter data array has been handled (as determined by the step G8), then the number of masked points is counted and a percentage mask is calculated at a step G10. The percentage mask is the proportion of the data samples within the parameter data array which have been masked. At a step G11, it is determined whether the percentage mask exceeds a threshold maximum value (80% in the present example), and if so a fail report is generated at a step G12 indicating that the parameter has failed the MinMax test and indicating the percentage mask. If the percentage mask does not exceed the threshold maximum value then it is next determined at a step G13 whether the percentage mask is greater than 0% (although it will be appreciated that other low thresholds could be used), and if so generates a pass with mask report at a step G14. If it is determined that the percentage mask is not greater than 0% it is determined that no limit exceedances are detected, and a pass result with no detected exceedances is generated at a step G15 and is noted in the report at the step G16. It will be appreciated that by the above technique, if any limit exceedances are detected but the total number of exceedances is less than the preset threshold, a pass result is registered. If the number of masked data points exceeds the preset threshold a fail result is registered in the report along with the percentage of masked data points. The data is not analysed by any further algorithms in the case of a fail report with percentage mask but is analysed further in the case of a pass report with percentage mask (subject to the exception mentioned below).

Rate of Change Detection Algorithm

Figure 13:
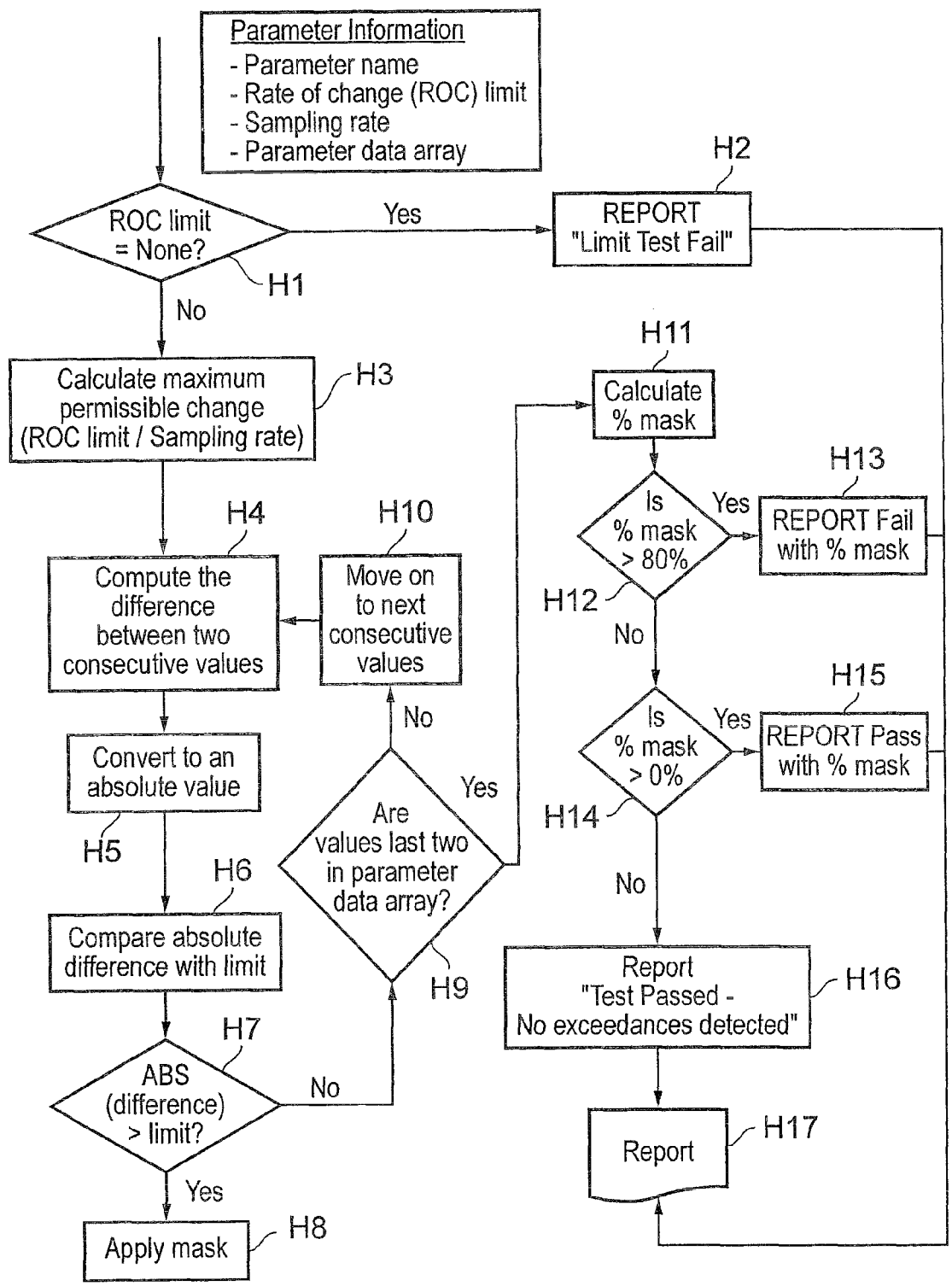
FIG. 13 is a schematic flow diagram of the ROC test of FIG. 4.

The rate of change (ROC) test is an algorithm which checks for spikes in the data. A flow diagram for the rate of change detection algorithm can be seen in FIG. 13. The parameter data array, parameter name, rate of change limit and the sampling frequency for the parameter are passed into the algorithm as parameter information. The rate of change limit is obtained from the parameter information that is input into the algorithm with the parameter data array. The first step of the algorithm is to check the value of the ROC limit at a step H1. If the ROC limit reads 'None', no limit is available for the parameter so the test fails at a step H2 and a note is made in the report at a step H17. If the ROC limit contains any value except 'None' the limit is divided by the sampling frequency at a step H3 to calculate the maximum permissible change between each sample. When the maximum change has been computed, the differences between every consecutive pair of samples is calculated at a step H4. These differences are then converted into absolute values at a step H5 to account for any negative numbers. The differences are then compared with the ROC limit at a step H6 and it is determined at a step H7 whether the ROC limit is exceeded. If the ROC limit is determined to be exceeded then the data samples are masked at a step H8. If however the ROC limit is determined not to be exceeded then it is determined at a step H9 whether the two consecutive values are the last two in the parameter data array. If there are further samples then at a step H10 the next two consecutive values are selected and the processing returns to the step H4.

Once the last two consecutive values in the parameter data array have been handled (as determined by the step H9), then the number of masked points is counted and a percentage mask is calculated at a step H11. The percentage mask is the proportion of the data samples within the parameter data array which have been masked. At a step H12, it is determined whether the percentage mask exceeds a threshold maximum value (80% in the present example), and if so a fail report is generated at a step H13 indicating that the parameter has failed the ROC test and indicating the percentage mask. If the percentage mask does not exceed the threshold maximum value then it is next determined at a step H14 whether the percentage mask is greater than 0% (although it will be appreciated that other low thresholds could be used), and if so generates a pass with mask report at a step H15. If it is determined that the percentage mask is not greater than 0% it is determined that no exceedances are detected, and a pass result with no detected exceedances is generated at a step H16 and is noted in the report at the step H17. It will be appreciated that by the above technique, if any exceedances are detected but the total number of exceedances is less than the preset threshold, a pass result is registered. If the number of masked data points exceeds the preset threshold a fail result is registered in the report along with the percentage of masked data points. The data is not analysed by any further algorithms in the case of a fail report with percentage mask but is analysed further in the case of a pass report with percentage mask (subject to the exception mention below).

It will be appreciated that both the MinMax test and the ROC test may result in certain portions of the parameter data array being masked so that some invalid data is ignored by the analysis stage when detecting events, but the rest of the samples for that parameter are still considered. A determination of whether the parameter passes to the second processing stage may be based on the overall percentage mask.

Noise Detection Algorithm (NDA)

The level of noise shown in a signal can often be used as an indicator to the health of the flight data recorder system and its associated sensors. One formula for computing the noise level in the signal is the root mean squared of each sample value minus the mean of the two adjacent samples, but it will be appreciated that alternative functions can be used to compute noise levels in the signal. The equation for the calculation of the RMS noise can be seen below:

$$\text{RMS\_Noise} = \sqrt{\frac{\sum_{n=2}^{n=N-1}\left[x_n - \left(\frac{x_{n-1} + x_{n+1}}{2}\right)\right]^2}{(N-2)}}$$

Figure 14:
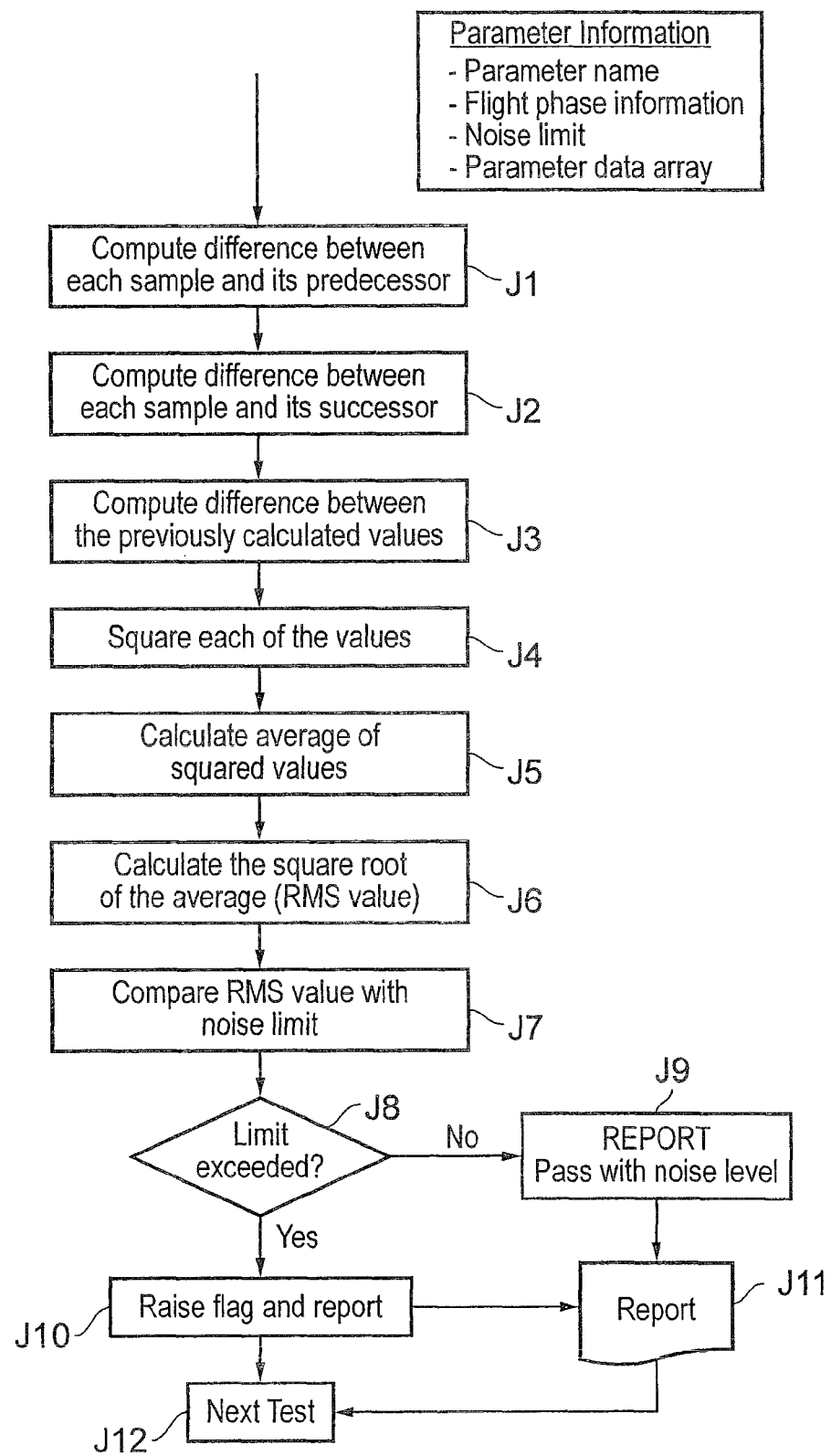
FIG. 14 is a schematic flow diagram of the noise test of FIG. 5.

A flow diagram for the noise detection algorithm can be seen in FIG. 14. To initiate the noise detection algorithm, the following information is fed into the algorithm:

Parameter data.

Flight phase of interest.

RMS noise threshold.

Flight phase information.

The parameter data is passed into the algorithm with the noise threshold for the particular parameter and the flight phase information for the flight. At a step J1 a difference is computed between each sample and its predecessor. At a step J2 a difference is computed between each sample and its successor. At a step J3 a difference is computed between the values calculated in the steps J1 and J2 and halved. Each of the values computed at the step J3 is then squared at a step J4. At a step J5, an average of the squared values is calculated, and at a step J6 the square root of the average (RMS value) is calculated. The RMS value is then compared with the noise limit provided in the parameter information. If at a step J8 the limit is determined to be exceeded, then a flag is raised and put on the report at a step J10. If however at the step J8 the limit is determined not to be exceeded, a report is made indicating the calculated noise level at a step J9. In either case, a report is generated at a step J11. At a step J12, the process continues onto the next stage.

The data shown below shall be used as sample data to demonstrate the RMS method.

| 8 | 7 | 6 | 9 | 4 | 8 | 2 | 7 | 5 | 1 | 1 | 0 |
|---|---|---|---|---|---|---|---|---|---|---|---|

The parameter data is first divided into sections according to the flight phase information.
Flight Phase Information:
Samples 1 to 9=Descent
Samples 10 to 12=Landing
For the purposes of this explanation, a calculation of the noise during the descent phase shall be presented. The data for the descent phase is isolated for analysis:

| 8 | 7 | 6 | 9 | 4 | 8 | 2 | 7 | 5 |
|---|---|---|---|---|---|---|---|---|

The algorithm then iterates through the signal data calculating the difference between each sample and its predecessor (calculation set 1). The algorithm then iterates through the signal data once again calculating the difference between each sample and its successor (calculation set 2).

The data from these calculations can be seen in tabular format below:

| Calculation Set 1 | Calculation Set 2 |
|---|---|
| −1 | 0 |
| −1 | −1 |
| 3 | −1 |
| −5 | 3 |
| 4 | −5 |
| −6 | 4 |
| 5 | −6 |
| −2 | 5 |
| 0 | −2 |

The difference between each of the related values (shown above in adjacent columns) is then calculated.

| Calculation Set 1 | Calculation Set 2 | Difference |
|---|---|---|
| −1 | 0 | Not used |
| −1 | −1 | −1 − (−1) = 0 |
| 3 | −1 | −1 − (3) = −4 |
| −5 | 3 | 3 − (−5) = 8 |
| 4 | −5 | −5 − (4) = −9 |
| −6 | 4 | 4 − (−6) = 10 |
| 5 | −6 | −6 − (5) = −11 |
| −2 | 5 | 5 − (−2) = 7 |
| 0 | −2 | Not used |

Each of the calculated values is then squared as can be seen in the table below.

| Calculation Set 1 | Calculation Set 2 | Difference/2 | (Difference)^2 |
|---|---|---|---|
| −1 | 0 | Not used | Not used |
| −1 | −1 | 0 | 0 |
| 3 | −1 | −2 | 4 |
| −5 | 3 | 4 | 16 |
| 4 | −5 | −4.5 | 20.25 |
| −6 | 4 | 5 | 25 |
| 5 | −6 | −5.5 | 30.25 |
| −2 | 5 | 3.5 | 12.25 |
| 0 | −2 | Not used | Not used |
| | | | Total = 107.75 |

The total of the squared values is then divided by the total number of values to calculate the average:
Number of samples in the data set excluding endpoints=7
Total=107.75
Average=107.75/7=15.393 Finally, the square root of the average is calculated to provide an estimation of the noise in the signal:
RMS=√Average
RMS=√15.393
RMS=3.9234
This calculated RMS value is compared with the noise threshold to determine if excessive noise was detected for the phase of flight.
RMS Noise result=3.9234
RMS Noise Threshold=3.8
Result<=Threshold=FALSE
RMS Noise result=FAIL
If the calculated RMS value exceeds the threshold, the parameter data for that phase is not made available for future analysis. Consequently, a fail result for the phase is noted on the report. If the limit is not exceeded, a pass result for the phase is logged in the report. The procedure outlined above is repeated for all flight phases for each parameter.

Expected Values

The Expected Values Check is designed to detect system errors that produce incorrect values at specific points in a flight and report them to an airlines' engineering team. An example of an Expected Values Check is ensuring that airspeed during take off is between 240 and 120 knots. A flow diagram of the Expected Values Check can be seen in FIG. 15. To initiate the Expected Values Check algorithm, the following information is fed into the algorithm:
Configuration file containing:
List of parameters to be checked.
Flight phase of interest.
Type of test to be applied.
Upper and lower thresholds for the parameter.
Flight phase information.
The configuration file is a text based file containing the names of the parameters to be checked, the specific phase of interest, the upper and lower thresholds for the parameter and the type of test to be applied.

An example Expected Values configuration file is shown in FIG. 16. The Expected Values configuration file in this case shows only two entries (rows), but it will be appreciated that the Expected Values configuration file would be likely to include many entries—potentially one per flight data parameter per flight phase.

At a step K1 data is read from the configuration file. At a step K2 a parameter to be tested is selected from the configuration file. Parameter data is then obtained at a step K3, and data is isolated based on the flight phase of interest specified in the configuration file at a step K4. At a step K5 the selected Expected Values test is performed.

There are two different types of Expected Values test that can be applied to the parameter data. The first of these is the Phase Range test. This is similar to the min-max test described above in the sense that the data is checked to ensure all samples lie within a specific range for the phase. The first entry in the configuration file of FIG. 16 uses the phase range test and is extracted below:

"Airspeed, Takeoff, Phase Range, 240, 120"

The above indicates that for the Airspeed parameter, the flight phase to be analysed is the takeoff phase. At the point of takeoff, the airspeed should lie between 240 and 120 knots.

The algorithm iterates through the configuration file selecting one parameter for testing before moving on to the next. The name of the parameter is read from the list of parameters to be tested. The complete data array for the parameter is then obtained. Based on the flight phase indicated in the configuration file and the flight phase information provided, the data for the phase is isolated for testing. The Phase Range test is then called where each sample of airspeed in the phase is compared with the upper and lower limits. If the value lies within the expected range, the relationship is classified as a pass. If the value is not within the expected range, the sample is masked.

The other available test is Phase Average test. This is used as an estimate for the behaviour of a parameter during a specific period of time. An upper and lower limit is provided to allow a tolerance between the expected average value and the calculated average value.

The second entry in the configuration file of FIG. 16 uses the Phase Average test and is extracted below:

"Acceleration Normal, Taxi, Phase Average, 1.1, 0.9"

The above indicates that for the Acceleration Normal parameter, the flight phase to be analysed is the taxi phase. While the aircraft is taxiing from the terminal to the runway, the expected average value should be approximately 1 g. To allow for subtle fluctuations in the data, an upper limit of 1.1 and a lower limit of 0.9 are applied.

At a step K6 it is determined whether an Expected Values test result of the Expected Values test performed at the step K5 falls between Expected Value limits. If so, then a report that the Expected Values test has been passed is generated at a step K7. If the Expected Values test result does not fall between the Expected Value limits then the parameter is identified as faulty at a step K8 and a report that the Expected values test has failed for that parameter is generated at a step K9.

At a step K10, following on from one of the steps K7 or K9, it is determined whether the Expected Values test just completed was the last one in the configuration file. If there are further Expected Values tests to be completed then the process passes back to the step K2. If no further Expected Values tests are to be completed then a final report is generated at a step K11.

Figure 15:
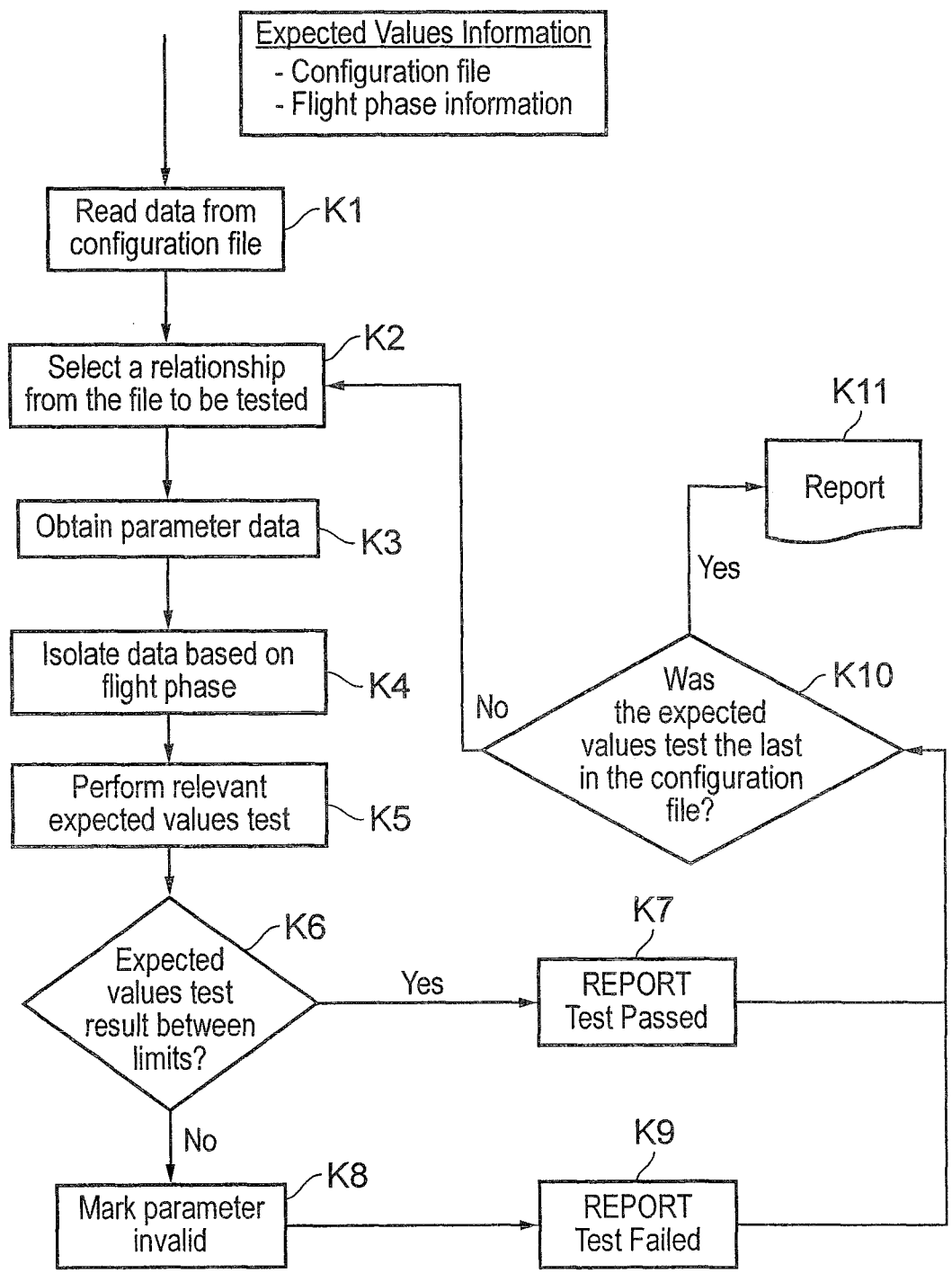
FIG. 15 is a schematic flow diagram of the calibration test of FIG. 5.

As will be understood from FIG. 15, the algorithm iterates through the configuration file selecting one parameter for testing before moving on to the next. The name of the parameter is read from the list of parameters to be tested. The complete data array for the parameter is then obtained. Based on the flight phase indicated in the configuration file and the flight phase information provided, the data for the phase is isolated for testing. The Phase Average test is then called where the average value for the phase is calculated using the isolated data set. The calculated average value is then checked to see if it lies between the upper and lower limits. If the calculated value lies within the expected range, the relationship is classified as a pass. If the value is not within the expected range, a fail result is recorded in the report and the parameter is identified as faulty. For example, the calibration check process for a normal acceleration parameter is as follows. An entry from the configuration file is selected:

"Acceleration Normal, Taxi, Phase Average, 1.1, 0.9"

Based on this entry, the algorithm obtains data for the Acceleration Normal parameter.

| Acceleration Normal |
|---|
| 0.95 |
| 0.95 |
| 0.95 |
| 0.96 |
| 0.96 |
| 0.95 |
| 0.96 |
| 0.94 |
| 0.95 |
| 0.97 |
| 1.00 |
| 0.99 |
| 1.02 |
| 0.99 |
| 0.98 |
| 1.03 |
| 1.01 |
| 1.00 |
| 0.99 |
| 1.01 |
| 0.98 |
| 0.99 |
| 1.00 |
| 1.01 |

Based on the flight phase listed in the configuration file and the flight phase information the data for the Taxi phase is isolated.

Flight Phase Information
Samples 1 to 10—Taxi
Samples 11 to 17—Takeoff
Samples 18 to 24—Climb

| Acceleration Normal |
|---|
| 0.95 |
| 0.95 |
| 0.95 |
| 0.96 |
| 0.96 |
| 0.95 |
| 0.96 |
| 0.94 |
| 0.95 |
| 0.97 |
| TOTAL = 9.54 |

The PhaseAverage test is applied and an average value for the Taxi phase is calculated by adding all the samples together and dividing by the total number of samples.

Calculated average value=9.54/10
Calculated average value=0.954

The expected range for the parameter is then read from the configuration file entry.

Upper threshold=1.1
Lower threshold=0.9

The calculated average value is then compared with the upper and lower limits to ensure that it is within the expected range. If all calculated values for a given parameter lie within the expected range, the test passes. If any calculated value is outside the expected range the test fails.

Correlation and Calibration Checks

The final stages of the flight data validation system are the correlation and calibration tests. These tests are considered together as a single calculation provides the numerical results for both tests.

Figure 17:
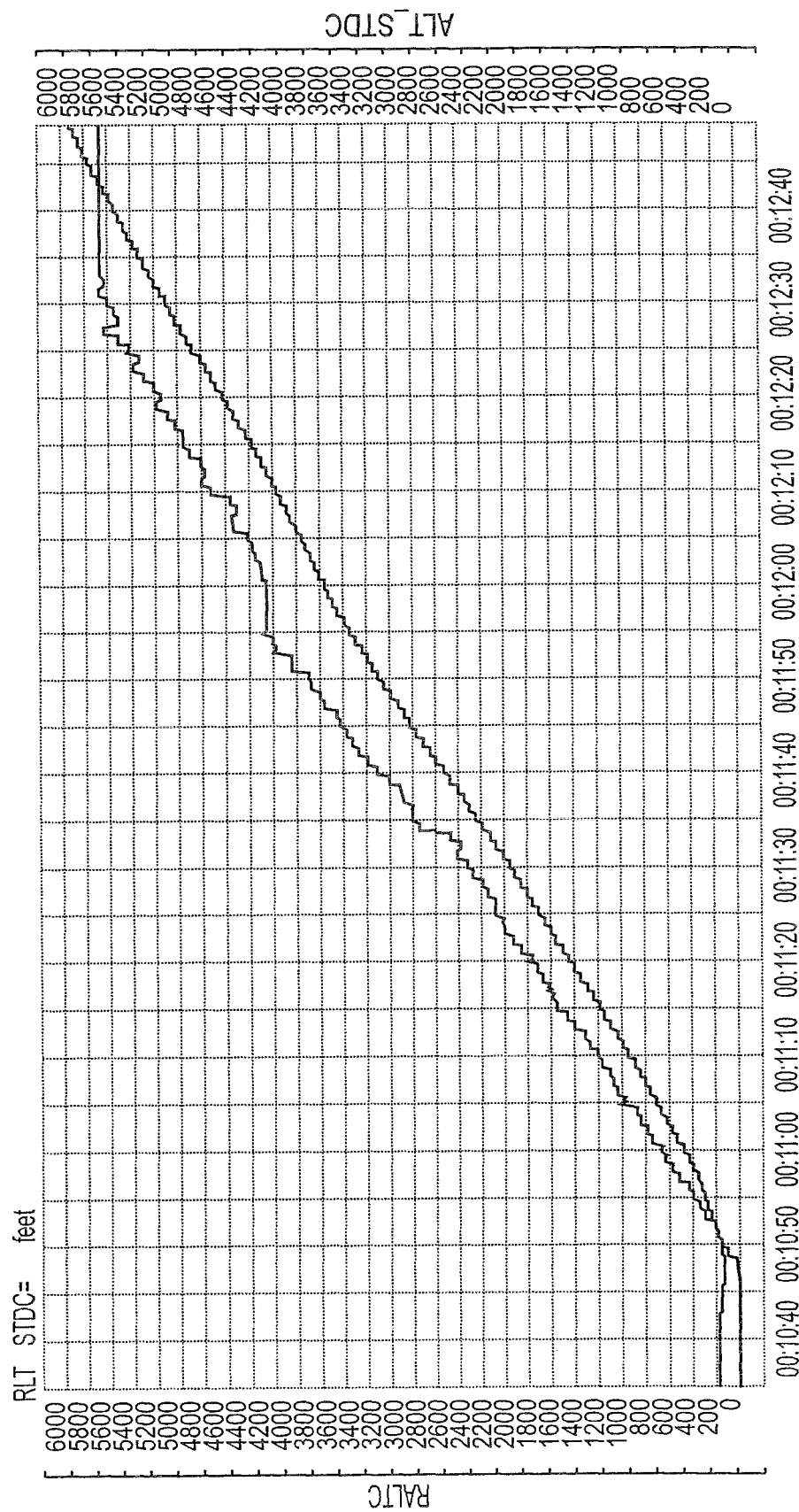
FIG. 17 schematically illustrates a relationship between a radio altitude and pressure altitude of an aircraft during the climb phase of a flight.

The aim of the correlation test is to check that relationships that exist between parameters are valid. An example of a correlation check is ensuring that as the altitude of the aircraft is increasing, the air temperature is decreasing. A diagram of parameters with a strong correlation, namely pressure altitude and radio altitude, can be seen in FIG. 17. The two traces represent the radio altitude of the aircraft and the pressure altitude of the aircraft. It can be clearly seen that for low altitudes, as the pressure altitude of the aircraft is increasing, the radio altitude is also increasing. This indicates that there is a strong correlation between these two parameters. The purpose of the Correlation Check is to assess the strength of the relationship and the Calibration Check tests for the correct linear characteristics between pairs of parameters.

Once the strength of the relationship has been established as satisfactory, the mathematical relationship between the two parameters is tested to ensure that it lies within the expected range.

Figure 18:
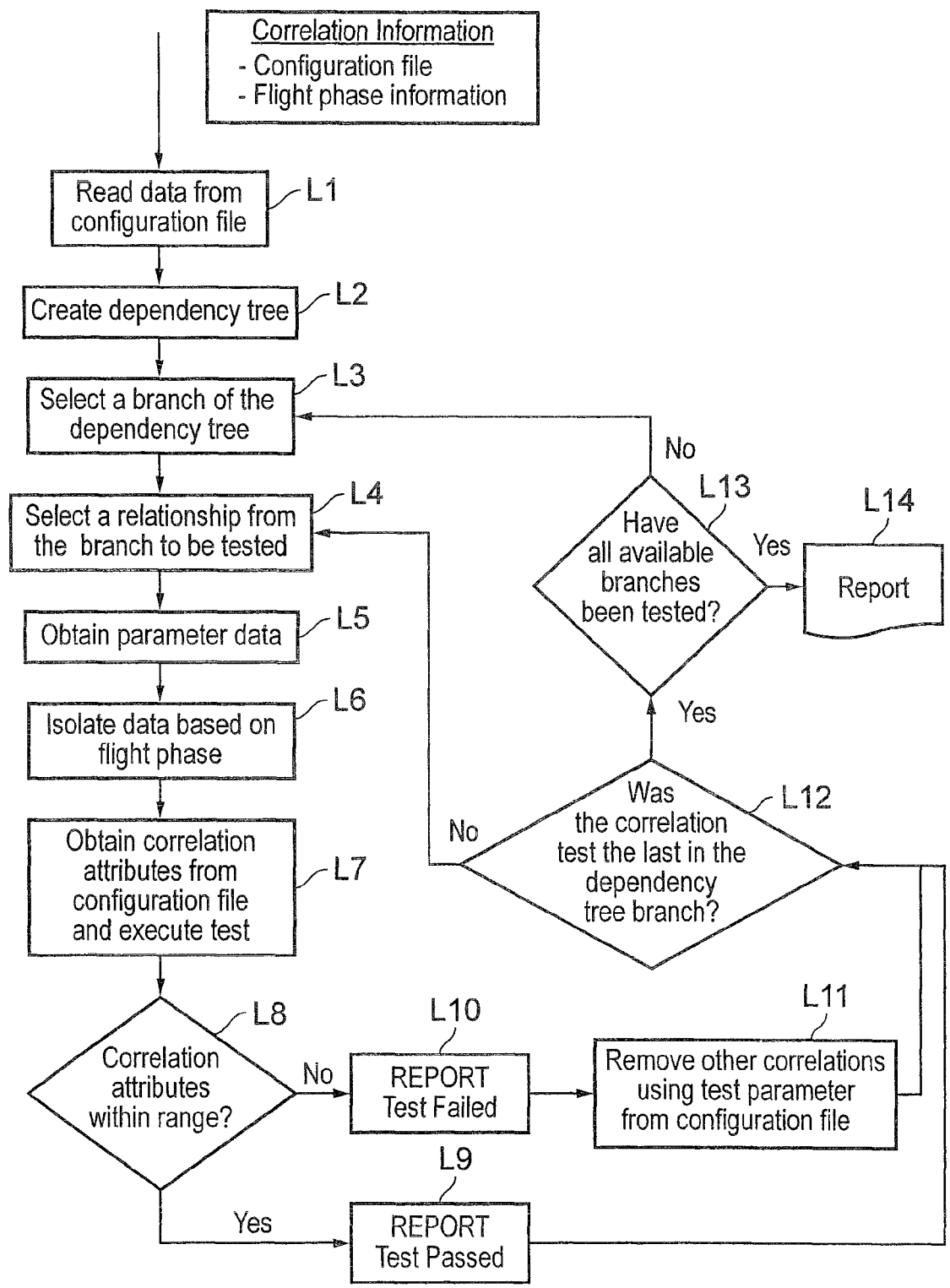
FIG. 18 is a schematic flow diagram of the correlation test of FIG. 5.

A flow diagram of how the Correlation and Calibration_Checks assess the relationship between parameters can be seen in FIG. 18. To initiate the correlation analysis the following information is fed in to the algorithm at a step L1:
  Correlation and Calibration file containing:
    Pair of correlated parameters.
    Optional pre-processing required for each parameter
    Nature of the relationship
    Correlation coefficient threshold
    Calibration coefficient limits
    Flight phase of interest
  Flight phase information.

The Correlation and Calibration file is a text based file containing the names of the parameters to be correlated, the specific phase of interest, the expected nature of the relationship and the correlation coefficient range.

An example Correlation and Calibration configuration file is shown in FIG. 19. The Correlation and Calibration configuration file in this case shows only four entries (rows), but it will be appreciated that the Correlation and Calibration configuration file would be likely to include many more entries than this.

The columns in the Correlation and Calibration configuration file comprise three parameter values Par1, Par2 and Par3. The parameter Par 1 is the dependent parameter, and the parameters Par2 and Par 3 (one or both of which could be used in a single test) are reference parameters. The fourth column defines an expression representing pre-processing that is to be performed on the reference parameters before the processing takes place. Typically this would be a differentiation of a reference parameter, but other operations may take place such as integration. The fifth column defines the nature of the expected relationship between the parameters. This may be a linear relationship which may or may not pass through the origin of the axes (i.e. zero), a discrete relationship or a variable-discrete relationship for example. It will be appreciated that other relationships might be expected, such as a logarithmic relationship.

The sixth column indicates the flight phase of interest. The seventh column indicates an expected Correlation coefficient threshold, while the eighth and ninth columns respectively indicate an upper and lower value for the gradient of the Calibration. The tenth and eleventh columns respectively indicate an upper and lower offset for the Calibration. The twelfth and thirteenth columns are provided to define the expected conditional values for a discrete or a variable discrete relationship. In particular the twelfth column indicates an expected value for Par 1 given the value or range specified in the thirteenth column.

As will be understood from the above, in some cases one or more of the parameters will require pre-processing to establish a relationship, for example the roll attitude can be tested against the rate of change of the aircraft heading (rather than against the aircraft heading itself), and so the heading is differentiated prior to testing.

In FIG. 19 this is indicated in the expression column in relation to the first entry (row) of the table as dp2. The full expression for dp2 may be as follows:

$$dp2 = \text{differentiate}(\text{parameter 2}) = \text{differentiate}(\text{heading})$$

In the example of the second entry (row) of the table of FIG. 19, the expression is dp2*p3, indicating the following full expression:

$$dp2*p3 = \text{differentiate}(\text{parameter 2}) \times \text{parameter 3} = \text{differentiate}(\text{heading} \times \text{groundspeed})$$

Other expressions for pre-processing are of course possible. For example, two parameters may be related, but there may be expected a delay between a change in one of the parameters and the corresponding change in the other. In order to pre-process for this type of relationship, the data samples of one or other of the parameters may be time shifted by an amount equivalent to the expected delay.

The expected nature of the relationship listed previously refers to whether the relationship between the parameters is linear, quadratic, between two discrete parameters (discrete) or between one variable parameter and one discrete parameter (variable-discrete).

An example of a linear correlation test is the relationship between pressure altitude and radio altitude, whereas the relationship between radio altitude and landing gear is a variable—discrete relationship. This nature is listed so that the correct correlation equation is applied to the data. For correlation testing of variable parameters, the modulus of Pearson's correlation coefficient may be used, so that it is only necessary to test for positive values when checking the strength of the correlation. Thereafter the slope is used to identify the sign of the correlation.

For linear relationships, the Pearson correlation equations listed below are applied to determine the correlation coefficient, the gradient and the offset of the line of regression.

The parameters used are:

$x$ = reference parameter $y$ = dependent parameter $N$ = number of sample points When analysing the data we compute:

$$\sum x$$
$$\sum y$$
$$\sum xy$$

$$\sum x^2$$
$$\sum y^2$$

so that at the end of the data analysis stage we can calculate b = slope a = offset c = correlatio n parameter (unsigned) from:

$$b = \frac{N\sum xy - \sum x \sum y}{N\sum x^2 - (\sum x)^2}$$

$$a = \frac{[\sum y - b\sum x]}{N}$$

$$c = \left| \frac{N\sum xy - \sum x \sum y}{\sqrt{N\sum x^2 - (\sum x)^2} \sqrt{N\sum y^2 - (\sum y)^2}} \right|$$

For correlation testing of relationships involving both variable and discrete parameters, the percentage of points that adhere to a specific relationship is calculated. The configuration file entries for correlation tests involving discrete parameters differ slightly from the entries for linear correlation tests. While entries for linear correlation test contain values relating to regression (which are used to check the calibration of a parameter), it is not possible to perform calibration testing on relationships relating to discrete parameter data. In order to test relationships using discrete data, it is necessary to know how the dependent parameter would act based on the given behaviour of the reference parameter. An entry for a relationship between a variable and a discrete parameter can be seen below:

Gear Down(L),Altitude Radio,Ground,0.90,1,<=0

The above entry, corresponding to the fourth entry (row) in FIG. 19, indicates that whilst the aircraft is on the ground, it is expected that when the radio altitude of the aircraft is less than or equal to zero then the landing gear should have a value equal to 1. For this particular method, when the data is obtained for both parameters and the relevant section of data is isolated, the following matrix is applied to determine the strength of the relationship:

|  | Landing Gear = 1 | Landing Gear = 0 |
| --- | --- | --- |
| Radio Altitude < 0 | A | B |
| Radio Altitude > 0 | B | A |

The area in the matrix marked 'A' indicate results which match the expected relationship listed in the configuration file. The areas marked 'B' indicate results which do not match. The correlation algorithm first iterates through the portions of data. If the radio altitude is less than or equal to zero and the landing gear is equal to 1, the counter increases by 1 for the top left box shown above. If the landing gear is equal to 0, the counter increases in the top right box. Similarly, if the radio altitude is greater than 0 and the landing is equal to 0, the counter increases for the bottom right portion of the matrix. If the radio altitude is greater than 0 and the landing gear is equal to 1, the counter increases in the bottom left portion. When all samples of data have been checked, the 'A' counts are added together and divided by the total number of samples checked. For the relationship shown in the configuration file example to pass the correlation test, over 90% of the results must lie within the 'A' section of data. This equates to a correlation coefficient of 0.9. If more than 20% of the results fall within the 'B' areas, a fail result is recorded in the report. The above method is applied to both variable-discrete and discrete-discrete correlations. The correlation coefficient threshold indicates the anticipated strength of the correlation being tested. A correlation coefficient result that is close to 1 indicates that there is a strong correlation between the parameters being tested. Whereas a correlation coefficient result with values less than 0.5 indicates weak or random correlation between the parameters.

The correlation coefficient test forms only one part of the Correlation and Calibration_analysis. To ensure that the numerical relationship between parameters is correct, regression testing can also be performed on the parameters. Regression analysis provides an estimation of how a dependent variable changes when an independent variable varies. In this system, Calibration testing is based on ensuring that the slope and offset of the regression line falls within the expected range. The primary reason for performing a Calibration Check is that a relationship could potentially pass the correlation coefficient check while the scaling of the parameter is incorrect.

The first stage of the Calibration Check is the calculation of the slope of the regression line based on the dependent and independent variables' data. This limit is then compared with the Calibration Check gradient limits from the configuration file. If the gradient of the line lies within this range, the test is classified as a pass. However, if the calculated gradient exceeds either the upper or lower limit, the scaling is deemed to be incorrect. A fail result is recorded in the report and a note is made that the scaling may be incorrect for the parameter.

As mentioned previously, incorrect calibration or scaling can also affect the offset of the regression line. The offset is calculated as part of the correlation algorithm and the calculated value is compared with the Calibration Check offset limits. If the calculated offset value lies within the limit range, the relationship passes the test and a pass result is recorded in the report. If the calculated offset value exceeds either of the offset limits, then a fail result is recorded in the report and a comment is made in the report indicating that the Calibration Check has failed.

Finally, one or more flight phases of interest are listed for each relationship. Applying the correlation equations to all flight phases can result in inaccurate data for some relationships. An example of this is in altitude and temperature. As aircraft take off in one location and land in another, it is not uncommon for the temperature at takeoff and the temperature at landing to differ. As a result, the overall results for the climb and descent sectors of flight may also differ. There may be a stronger correlation between the parameters during the climb phase than in the descent phase which has the potential to influence the overall correlation result. Therefore correlations are performed based on flight phase to provide more accurate results. To allow this, flight phase information is included in the correlation algorithm so that the relevant phases of flight noted in the configuration file can be isolated and tested individually. An example of relationship information that is stored in the correlation configuration file (first entry in FIG. 19) can be seen below:

Independent variable: Heading (Rate of Change)
Dependent variable: Roll
Phase(s): Turning In Air
Relationship: Linear through zero
Correlation threshold: 0.8
Calibration slope limits: 6.0, 8.0

Figure 20:
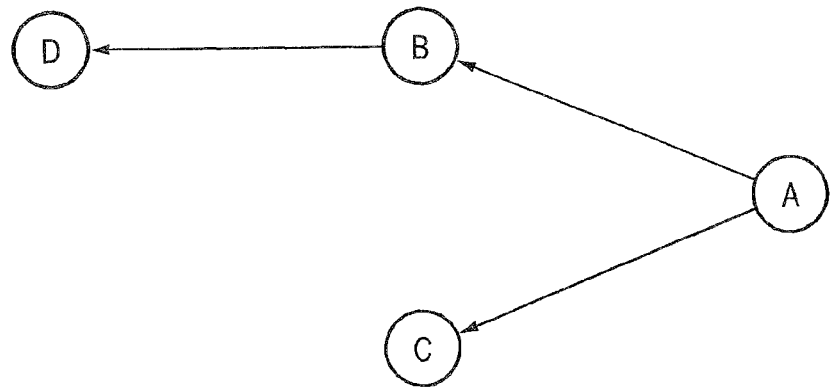
FIG. 20 schematically illustrates a dependency tree for the correlation test of FIG. 18.

To efficiently execute the correlation algorithms, the configuration file is used to generate a dependency tree at a step L2. A dependency tree is a directed graph which represents the dependencies of parameters. It is used to derive the order in which parameters should be evaluated. An example of a dependency tree can be seen in FIG. 20. From a correlation testing perspective, A, B, C and D represent parameters such as Altitude STD (A), Acceleration Normal (B), Altitude Radio (C) and Pitch Attitude (D). FIG. 20 indicates that the relationship between parameters A and B (Altitude STD and Acceleration Normal) is to be checked before the relationship between parameters B and D (Acceleration Normal and Pitch Attitude) can be analysed.

During correlation analysis, the algorithm iterates through a branch of the dependency tree selected at a step L3, selecting one relationship (an edge) for testing at a step L4 before moving on to the next. If any of these relationships fail the correlation test, subsequent correlations involving the test parameter are not tested. In the case shown previously, A is determined to be the reference parameter and parameter B is the test parameter. If the correlation between parameters A and B fails, no further correlations are completed using parameter B. Therefore the correlation between parameters B and D will not be tested. If the previous relationship passes the correlation test, the complete parameter data arrays for the next relationship in the dependency tree are obtained.

The parameter data relating to the relationship is obtained at a step L5, and then based on the flight phase indicated in the configuration file and the flight phase information, the data for the phase of interest is then isolated for testing at a step L6. The configuration file contains information regarding the nature of the relationship (e.g. linear or quadratic). This determines which correlation equation is applied to the data to determine the correlation between parameters. By applying these equations to the data, the correlation coefficient can be calculated at a step L7. The value estimated for the correlation coefficient is then compared with the upper and lower limit for the relationship at a step L8. If the value lies within the expected range listed in the configuration file, the relationship is classified as a pass at a step L9. If the value is not within the expected range, a fail result is recorded in the report at a step L10. If a fail result is recorded, at a step L11 other correlations using the test parameter are removed from the configuration file so that they are not analysed. Then, at a step L12 it is determined whether the correlation test was the last one in the current dependency tree branch. If it is determined that the correlation test was not the last one in the current dependency tree branch, then the process returns to the step L4 where a further relationship is selected and analysed. If it is determined that the correlation test was the last one in the current dependency tree branch, then it is determined at a step L13 whether all available branches have been tested. If not then a further branch is selected at the step L3. If all available branches have been tested then the correlation analysis ends and a final report is prepared.

For example, one of the relationships in the configuration file shown previously was between Altitude STD and Altitude Radio:

"Altitude STD, Altitude Radio, Linear, 1, 0.8, Initial Climb"

Based on this entry in the configuration file, the algorithm first checks the results from the first stage of analysis for the two parameters.

Altitude STD—Result=PASS
Altitude Radio—Result=PASS

As both parameters passed the first stage of analysis, the algorithm then obtains data for each of the parameters as seen below:

| Altitude STD | Altitude Radio |
| --- | --- |
| 2 | −2 |
| 2 | −1 |
| 8 | 18 |
| 36 | 40 |
| 88 | 72 |
| 136 | 111 |
| 188 | 149 |
| 244 | 189 |
| 300 | 235 |
| 344 | 285 |
| 400 | 409 |
| 402 | 409 |
| 401 | 409 |
| 399 | 409 |
| 400 | 409 |
| 368 | 278 |
| 329 | 195 |
| 300 | 102 |
| 257 | 64 |
| 189 | 32 |
| 188 | 14 |
| 187 | −1 |
| 187 | −1 |
| 187 | −2 |

Figure 21:
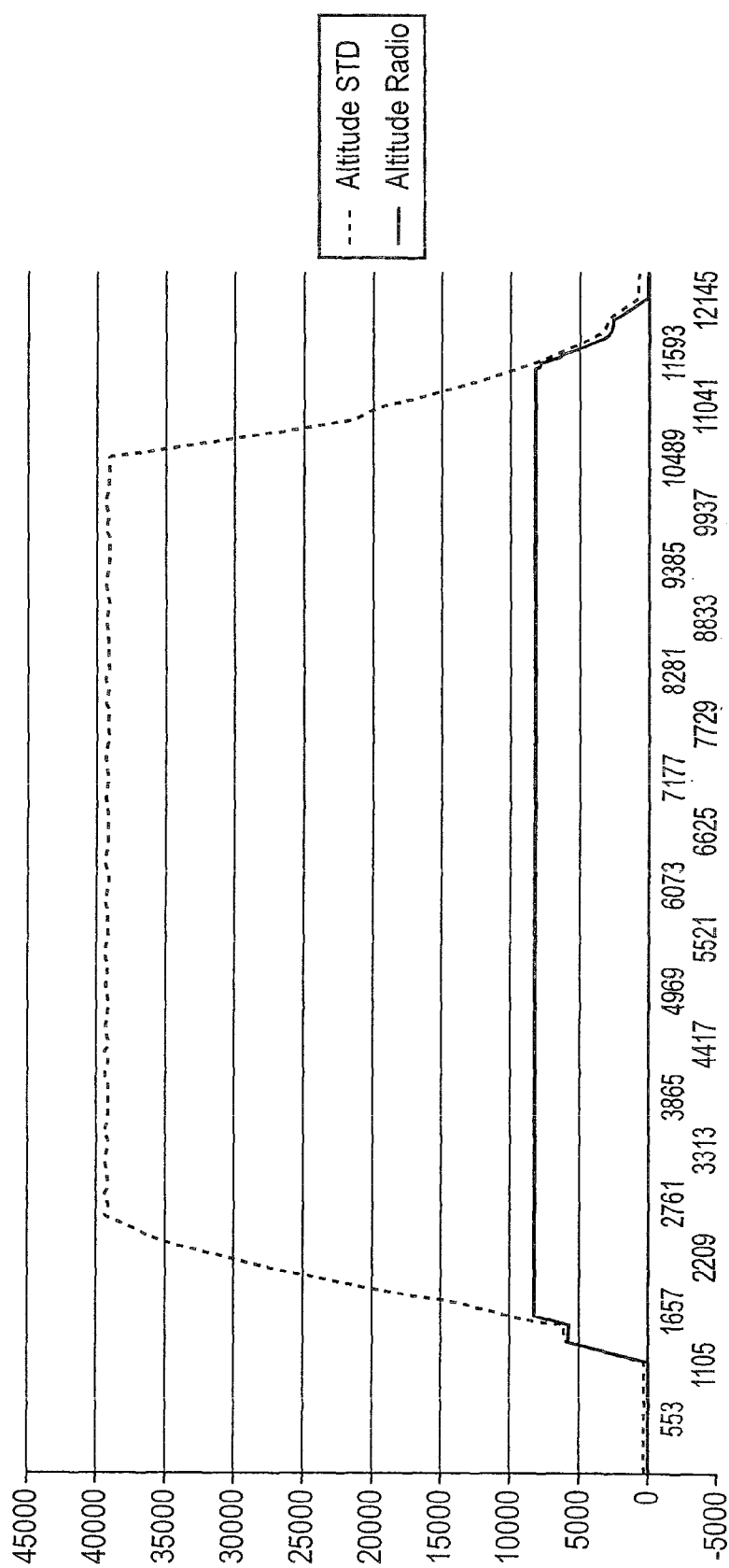
FIG. 21 schematically illustrates a plot showing an example relationship between radio and pressure altitude for an entire flight.

A graphical representation of this data can be seen in FIG. 21.

If all the data for these parameters was analysed, the result may be inaccurate. Information about the phases of flight for this particular recording can be accessed to provide a more accurate result.

Flight Phase Information:
Samples 1 to 2=Taxi
Samples 3 to 10=Climb
Samples 11 to 15=Cruise
Samples 16 to 20=Descent
Samples 21 to 24=Landing The flight phase of interest for this particular relationship is the climb phase. Samples 3 to 10 are isolated for both sets of data as seen below:

| Altitude STD—Climb | Altitude Radio—Climb |
| --- | --- |
| 8 | 18 |
| 36 | 40 |
| 88 | 72 |
| 136 | 111 |
| 188 | 149 |
| 244 | 189 |
| 300 | 235 |
| 344 | 285 |

This data can then be analysed to generate a result for the correlation between radio altitude and pressure altitude during the climb phase.

The configuration file states that the expected nature of the relationship is linear therefore the data is processed against the linear correlation equation. The result of this equation is in the form of an absolute correlation coefficient which is a value between 0 and +1.

Correlation Result=0.97

To identify if the correlation passes or fails the correlation test, the calculated correlation coefficient is compared with the threshold listed in the configuration file. If the result is greater than or equal to the threshold, a pass result is given. If the calculated correlation coefficient is below this threshold, a fail result is given.

Correlation Lower Limit=0.8
Result>=Lower Limit=TRUE
Correlation coefficient result=PASS The next stage of the correlation analysis is to test the scaling and offset of the relationship by performing a regression analysis. The gradient of the regression line for the data is calculated.

Gradient Result=0.7058

To identify if the relationship passes or fails the gradient test, the calculated gradient value is compared with the upper and lower limits listed in the configuration file. If the result is between the thresholds, a pass result is recorded. If the calculated gradient is above the upper threshold or below the lower threshold, a fail result is recorded.

Gradient Upper Limit=1.1
Gradient Lower Limit=0.9
Result<=Upper Limit=TRUE
Result>=Lower Limit=FALSE
Correlation coefficient result=FAIL The final stage of the correlation analysis is to determine if the offset of the regression line falls within the expected range for the relationship. The offset of the line of regression is calculated.

Offset Result=0.88

To identify if the relationship passes or fails the offset test, the calculated offset value is compared with the upper and lower offset limits listed in the configuration file. If the result is between the two thresholds, a pass result is recorded. If the calculated offset is above the upper threshold or below the lower threshold, a fail result is recorded.

Offset Upper Limit=0.9
Offset Lower Limit=0.8
Result<=Upper Limit=TRUE
Result>=Lower Limit=TRUE
Correlation coefficient result=PASS When all the steps mentioned previously have been executed, the algorithm then selects the next relationship listed in the configuration file for testing. The results of each of the correlation tests and the calculated correlation coefficients are noted in the report which is given to the customer upon completion of the flight data validation process.

The above techniques permit the efficient and reliable validation of flight data with minimal or no user input. By performing validation before analysing the validated flight data, false positive detections of events caused by unreliable flight data can be reduced, reducing the amount of time spent by flight data analysts in analysing invalid events.

The results of all tests except for the ARINC®© test are likely to be included in the final report. The ARINC®© test is provided only to prevent the occurrence of false positives in subsequent tests, and its reporting is therefore not required.

It will be appreciated that the original flight data set may not be altered by the above processes. The report indicating the validity of the data in the flight data set may be provided as a separate document.

Figure 22:
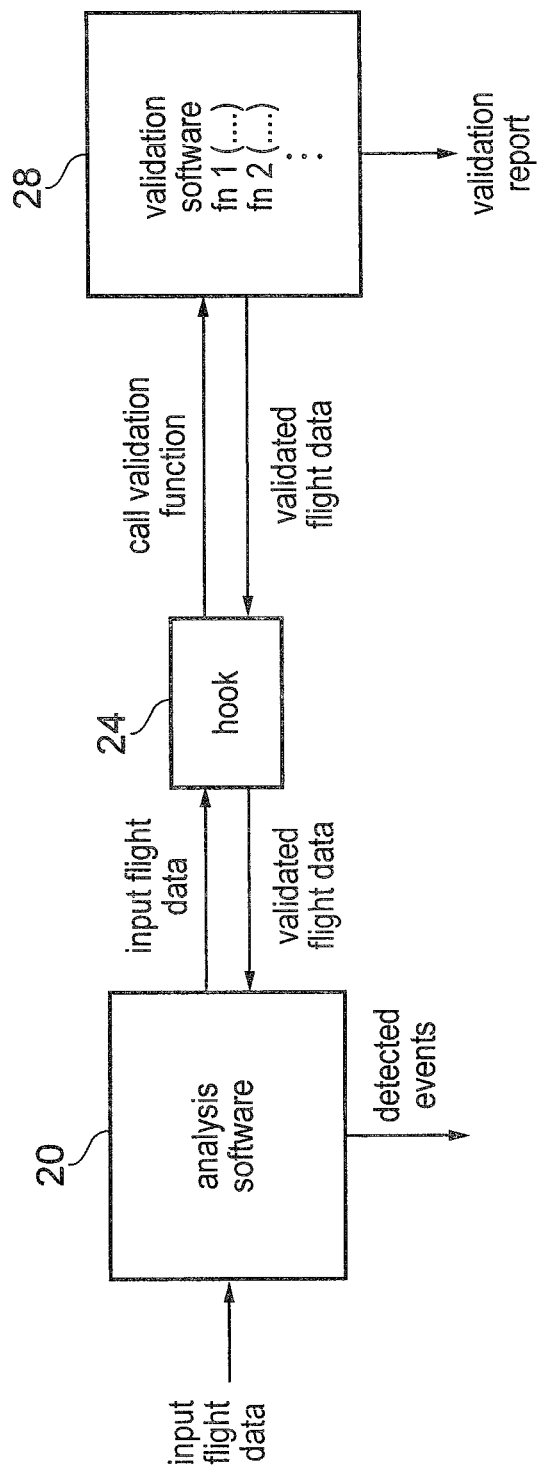
FIG. 22 schematically illustrates an example software implementation of the flight data monitoring method.

FIG. 22 shows a software implementation of the flight data monitoring method. The software includes flight data analysis software 20, a software hook 24, and flight data validation software 28 including a number of validation functions fn1, fn2 corresponding to different validation tests such as those described above. The analysis software 20 receives the input flight data obtained by the flight data recording system 1, and in the absence of the software hook 24 would analyse the input flight data to detect the events of interest. However, the software hook 24 intercepts the processing of the input flight data by the flight data analysis software 20 and calls one or more validation functions of the flight data validation software 28. The validation functions validate the input flight data to generate validated flight data. The software hook 24 modifies the behaviour of the analysis software to analyse the validated flight data instead of the input flight data. This implementation can be useful to allow legacy analysis software 20 which does not have a validation function to be reused for implementing the present technique. The software hook 24 allows the analysis software 20 to be modified to implement the validation functions of the validation software 28, with little modification to the program code of the analysis software 20.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Clauses:

The following clauses define further features of embodiments of the invention which may be combined with features of the claims.

1. A computer-implemented flight data monitoring method comprising:
receiving input flight data;
performing flight data validation on the input flight data to generate validated flight data; and
performing flight data analysis on the validated flight data to detect at least one predetermined type of flight event.

2. The flight data monitoring method according to clause 1, wherein the input flight data comprises a set of parameters sampled at time intervals providing a series of data values for each parameter.

3. The flight data monitoring method according to clause 2, wherein a data value which fails the flight data validation is identified as an invalid data value.

4. The flight data monitoring method according to clause 3, wherein the flight data analysis excludes data values identified as invalid by the flight data validation.

5. The flight data monitoring method according to any of clauses 2 to 4, wherein a parameter which fails the flight data validation is identified as an invalid parameter.

6. The flight data monitoring method according to clause 5, wherein the flight data analysis excludes a parameter identified as invalid by the flight data validation.

7. The flight data monitoring method according to any of clauses 1 to 6, wherein the flight data validation generates a validation report indicating the validity of the input flight data.

8. The flight data monitoring method according to any of clauses 1 to 7, wherein the flight data validation comprises a repeating pattern test for detecting occurrences of a repeating signal pattern in data values of a parameter of the input flight data.

9. The flight data monitoring method according to clause 8, wherein the flight data validation includes masking data values corresponding to the occurrences of the repeating signal pattern detected in the repeating pattern test, wherein the masked data values are excluded from the flight data analysis.

10. The flight data monitoring method according to any of clauses 2 to 9, wherein the flight data validation comprises a spike detection test for detecting spikes in the data values of a parameter of the input flight data.

11. The flight data monitoring method according to clause 10, wherein the flight data validation includes masking data values corresponding to the spikes detected by the spike detection test, wherein the masked data values are excluded from the flight data analysis.

12. The flight data monitoring method according to any of clauses 2 to 11, wherein the flight data validation comprises a range comparison test for determining whether data values of a parameter of the input flight data are within a predetermined range.

13. The flight data monitoring method according to clause 12, wherein the flight data validation includes masking data values that are determined to be outside the predetermined range by the range comparison test, wherein the masked data values are excluded from the flight data analysis.

14. The flight data monitoring method according to any of clauses 2 to 13, wherein the flight data validation comprises a correlation test for determining a degree of matching between an actual relationship between two or more parameters of the input flight data and an expected relationship between the two or more parameters.

15. The flight data monitoring method according to clause 14, wherein the flight data validation comprises marking a parameter that fails the correlation test as invalid, wherein the flight data analysis excludes the parameter marked as invalid.

16. The flight data monitoring method according to any of clauses 2 to 15, wherein the flight data validation comprises at least one of:
(i) a sampling rate analysis test for determining whether an actual sampling rate of a parameter of the input flight data substantially matches an expected sampling rate for that parameter;
(ii) a change detection test for determining whether a parameter of the input flight data demonstrates an expected change of value;
(iii) a noise detection test for determining whether a noise level of data values of a parameter of the input flight data exceeds a predetermined threshold; and
(iv) an expected value test for determining whether data values of a parameter of the input flight data have an expected value or a value within an expected range.

17. The flight data monitoring method according to any of clauses 1 to 16, wherein the flight data analysis compares the validated flight data with event thresholds to identify the at least one predetermined type of flight event.

18. The flight data monitoring method according to any of clauses 1 to 17, wherein the flight data analysis is performed by flight data analysis software for analysing the input flight data;
the flight data validation is performed by flight data validation software comprising at least one validation function for performing a validation test on the input flight data; and
the method includes a step of using at least one software hook to modify the functionality of the flight data analysis software to call the at least one validation function of the flight data validation software and to analyse the validated flight data instead of the input flight data.

19. A computer-implemented flight data monitoring system for monitoring input flight data, the flight data monitoring system comprising:
flight data validation circuitry configured to perform data validation processing on the input flight data to generate validated flight data; and
flight data analysis circuitry configured to analyse the validated flight data to detect at least one predetermined type of event.

20. At least one computer program which, when executed on a computer, controls the computer to perform the method of any of clauses 1 to 18.

21. A computer-readable recording medium storing the at least one computer program of clause 20.

22. A flight data validation method, comprising:
receiving flight data comprising a set of parameters sampled at time intervals providing a series of data values for each parameter;
obtaining, from a configuration file, an expected relationship between two or more parameters of the received flight data;
determining a degree of matching between the expected relationship and an actual relationship between the two or more parameters of the received flight data; and
generating result data based on the determined degree of matching.

23. A flight data validation method according to clause 22, wherein the step of determining the degree of matching comprises determining a degree of correlation between the two or more parameters using a correlation equation selected in dependence on the expected relationship.

24. A flight data validation method according to clause 23, wherein the step of generating result data indicates a fail result for one or more of the two or more parameters if the determined degree of correlation is outside a predetermined range.

25. A flight data validation method according to any of clauses 22 to 24, wherein the step of determining the degree of matching comprises determining a regression line for the actual relationship between the two or more parameters and determining whether one or both of the gradient and offset of the regression line are within a predetermined range.

26. A flight data validation method according to clause 25, wherein the step of generating result data indicates a fail result for one or more of the two or more parameters if one or both of the gradient and offset of the regression line are outside of the predetermined range.

27. A flight data validation method according to any of clauses 22 to 26, comprising:
determining, from the configuration file, a flight phase of interest in the flight data; and
extracting data values of the flight data corresponding to the determined flight phase of interest from the received flight data; wherein the expected relationship relates to the flight phase of interest and the degree of matching is determined based on the actual relationship between the two or more parameters in the extracted data values.

28. A flight data validation method according to clause 27, wherein the flight phases associated with the data values are determined only using airspeed, pressure altitude and heading parameters.

29. A flight data validation method according to any of clauses 22 to 28, comprising pre-processing one or more of the two or more parameters of the received flight data prior to determining the degree of matching.

30. A flight data validation method according to clause 29, wherein the pre-processing comprises differentiating the one or more of the two or more parameters.

31. A flight data validation method according to clause 29, wherein the pre-processing comprises shifting samples of one or more of the two or more parameters with respect to time to compensate for an expected delay between a change in a first parameter and a corresponding change in a second parameter.

32. A flight data validation method according to any one of clauses 29 to 31, wherein the pre-processing comprises combining two or more of the parameters to generate a derived parameter.

33. A flight data validation method according to any of clauses 22 to 32, wherein a relationship between two or more parameters is not tested if one or more of the related parameters has failed a validation test.

34. A flight data validation method according to any of clauses 22 to 33, wherein parameters of the flight data are hierarchically related using a dependency tree in which one or more root reference parameters are defined as a root level in the hierarchy, and in which parameters to be tested are related to one or more of the root reference parameters either directly or via one or more intermediate reference parameters; relationships between parameters to be tested and one or more direct or intermediate reference parameters are tested in order in a branch of the dependency tree starting with a parameter related only to one or more root reference parameters and progressing to a parameter related to one or more intermediate reference parameters; and a relationship between a parameter to be tested and a reference parameter is not tested if the reference parameter has failed a validation test.

35. A flight data validation system, comprising:
logic for receiving flight data comprising a set of parameters sampled at time intervals providing a series of data values for each parameter;
logic for obtaining, from a configuration file, an expected relationship between two or more parameters of the received flight data;
logic for determining a degree of matching between the expected relationship and an actual relationship between the two or more parameters of the received flight data; and
logic for generating result data based on the determined degree of matching.

36. A flight data validation method, comprising:
receiving flight data comprising a set of parameters sampled at time intervals providing a series of data values for each parameter;
processing, at a first validation stage comprising one or more first stage validation tests, the data values associated with each of the parameters, determining a pass or fail condition for each parameter based on the first stage validation tests, and generating first stage result data;
processing, at a second validation stage comprising one or more second stage validation tests, the data values associated only with parameters for which a pass condition was determined at the first validation stage, and generating second stage result data; and
generating a validation report comprising the first stage result data and the second stage result data.

37. A flight data validation method according to clause 36, wherein the first stage result data comprises an indication of a failure state in relation to those parameters having data values which failed one or more of the first stage validation tests; and the second stage result data comprises an indication of a failure state for those parameters which failed one or more of the second stage validation tests.

38. A flight data validation method according to clause 36 or claim 37, wherein the first stage validation tests comprise a sampling rate analysis test for determining whether an actual sampling rate of a parameter of flight data substantially matches an expected sampling rate for that parameter.

39. A flight data validation method according to clause 38, wherein the first stage result data is set to indicate whether or not the actual sampling rate of a parameter of flight data substantially matches the expected sampling rate for that parameter.

40. A flight data validation method according to clause 38 or clause 39, wherein if the sampling rate analysis test determines that the actual sampling rate of a parameter of flight data does not substantially match the expected sampling rate for that parameter, subsequent first stage validation tests are not executed.

41. A flight data validation method according to any one of clauses 38 to 40, wherein the sampling rate analysis test is conducted in relation to a single flight and comprises the steps of:
identifying a duration corresponding to the flight;
calculating an expected number of samples for the flight from the identified flight duration and the expected sampling rate; and
comparing the calculated expected number of samples with the actual number of samples corresponding to the flight duration in the flight data;
wherein the actual sampling rate of the parameter of flight data is determined to substantially match the expected sampling rate for that parameter if the calculated expected number of samples substantially matches the actual number of samples in the flight data.

42. A flight data validation method according to one of clauses 36 to 41, wherein the first stage validation tests comprise a change detection test for determining whether a parameter in the flight data demonstrates an expected change in value.

43. A flight data validation method according to clause 42, wherein the first stage result data is set to indicate whether or not the parameter of flight data demonstrates an expected change in value.

44. A flight data validation method according to clause 42 or clause 43, wherein if the change detection test determines that the parameter of flight data does not demonstrate an expected change in value for that parameter, subsequent first stage validation tests are not executed.

45. A flight data validation method according to any one of clauses 42 to 44, wherein the change detection test comprises the step of determining whether a change in the parameter is expected in dependence on a change flag in the flight data associated with the parameter of flight data.

46. A flight data validation method according to any one of clauses 36 to 45, wherein the first stage validation tests comprise a range comparison test for determining whether the data values of a parameter in the flight data are within a predetermined range.

47. A flight data validation method according to clause 46, wherein
the first stage result data is set to indicate whether or not the data values of a parameter in the flight data are within the predetermined range.

48. A flight data validation method according to clause 46 or clause 47, wherein if a data value is not within the predetermined range, the data value is marked as invalid.

49. A flight data validation method according to any one of clauses 36 to 48, wherein the first stage validation tests comprise a spike detection test for determining whether a parameter in the flight data comprise one or more spikes in its data values.

50. A flight data validation method according to clause 49, wherein the first stage result data is set to indicate whether or not the parameter in the flight data comprises one or more spikes in its data values.

51. A flight data validation method according to clause 49 or clause 50, wherein if a group of one or more data values are determined to be a spike, the group of one or more data values is marked as invalid.

52. A flight data validation method according to clause 49 or clause 50, comprising:
determining whether the proportion of data values for the parameter which are marked as invalid is greater than a predetermined threshold value; and if the proportion of data values for the parameter which are marked as invalid is greater than the predetermined threshold value, generating a fail condition for the parameter.

53. A flight data validation method according to clause 52, wherein the fail condition is indicated in the first stage result data.

54. A flight data validation method according to any one of clauses 36 to 53, wherein the second stage validation tests comprise a noise detection test for determining whether a noise level of data values of the parameter exceeds a predetermined threshold.

55. A flight data validation method according to clause 54, wherein the noise detection test is conducted separately for each of a plurality of flight phases.

56. A flight data validation method according to clause 54 or clause 55, wherein if the noise level of data values for the parameter exceeds the predetermined threshold, subsequent second stage validation tests are not executed.

57. A flight data validation method according to any one of clauses 36 to 56, wherein the second stage validation tests comprise an expected value test for determining whether data values of the parameter have an expected value or a value within an expected range.

58. A flight data validation method according to any one of clauses 36 to 57, wherein the second stage validation tests comprise an expected value test for determining whether data values of the parameter have an average value within an expected range.

59. A flight data validation method according to clause 57 or 58, wherein the expected value test is conducted separately for each of a plurality of flight phases.

60. A flight data validation method according to any one of clauses 57 to 59, wherein if the expected value test is failed, subsequent second stage validation tests are not executed.

61. A flight data validation method according to any one of clauses 36 to 60, wherein the second stage validation tests comprise a correlation test for determining a degree of matching between the expected relationship and an actual relationship between the two or more parameters of the received flight data.

62. A flight data validation method according to any one of clauses 36 to 61, comprising a step of detecting ARINC signal patterns in data values of a parameter, and marking the data values corresponding to any detected ARINC signal pattern as invalid.

63. A flight data validation method according to clause 55 or clause 59, wherein the flight phases associated with the data values are determined only using airspeed, pressure altitude and heading parameters.

64. A flight data validation system, comprising:
logic for receiving flight data comprising a set of parameters sampled at time intervals providing a series of data values for each parameter;
logic for processing, at a first validation stage comprising one or more first stage validation tests, the data values associated with each of the parameters, determining a pass or fail condition for each parameter based on the first stage validation tests, and generating first stage result data;
logic for processing, at a second validation stage comprising one or more second stage validation tests, the data values associated only with parameters for which a pass condition was determined at the first validation stage, and generating second stage result data; and
logic for generating a validation report comprising the first stage result data and the second stage result data.

65. A computer program, which when executed on a computer will cause the computer to perform a method according to any one of clauses 22 to 34 or 36 to 63.

66. A recording medium storing the computer program of clause 65.

This application claims priority of GB 1206652.8 filed Apr. 16, 2012 and GB 1218856.1 filed October 19, 201, all of which are incorporated herein by reference.

We claim:

1. A computer-implemented flight data monitoring method comprising:
receiving input flight data captured by an on-board recorder of an aircraft;
performing flight data validation on the input flight data to generate validated flight data; and
performing flight data analysis on the validated flight data to detect at least one predetermined type of flight event;
wherein the input flight data comprises a set of parameters sampled at time intervals providing a series of data values for each parameter; and
the flight data validation comprises a repeating pattern test for detecting occurrences of a repeating signal pattern in data values of a parameter of the input flight data based on a comparison of a first set of data values of said parameter of the input flight data with a subsequent set of data values of said parameter of the input flight data.

2. The flight data monitoring method according to claim 1, wherein the input flight data comprises a set of parameters sampled at time intervals providing a series of data values for each parameter.

3. The flight data monitoring method according to claim 2, wherein a data value or parameter which fails the flight data validation is identified as invalid.

4. The flight data monitoring method according to claim 3, wherein the flight data analysis excludes data values or a parameter identified as invalid by the flight data validation.

5. The flight data monitoring method according to claim 2, wherein the flight data validation comprises at least one of:
(a) a spike detection test for detecting spikes in the data values of a parameter of the input flight data;
(b) a range comparison test for determining whether data values of a parameter of the input flight data are within a predetermined range;
(c) a correlation test for determining a degree of matching between an actual relationship between two or more parameters of the input flight data and an expected relationship between the two or more parameters;
(d) a sampling rate analysis test for determining whether an actual sampling rate of a parameter of the input flight data substantially matches an expected sampling rate for that parameter;
(e) a change detection test for determining whether a parameter of the input flight data demonstrates an expected change of value;
(f) a noise detection test for determining whether a noise level of data values of a parameter of the input flight data exceeds a predetermined threshold; and
(g) an expected value test for determining whether data values of a parameter of the input flight data have an expected value or a value within an expected range.

6. A non-transitory computer-readable recording medium storing at least one computer program which, when executed on a computer, controls the computer to perform the method of claim 1.

7. A computer-implemented flight data monitoring system for monitoring input flight data captured by an on-board recorder of an aircraft, the flight data monitoring system comprising:
- flight data validation circuitry configured to perform data validation processing on the input flight data to generate validated flight data; and
- flight data analysis circuitry configured to analyse the validated flight data to detect at least one predetermined type of event;
- wherein the input flight data comprises a set of parameters sampled at time intervals providing a series of data values for each parameter; and
- the flight data analysis circuitry is configured to perform a repeating pattern test for detecting occurrences of a repeating signal pattern in data values of a parameter of the input flight data based on a comparison of a first set of data values of said parameter of the input flight data with a subsequent set of data values of said parameter of the input flight data.

* * * * *